US012656635B2

(12) United States Patent
Liang et al.

(10) Patent No.: US 12,656,635 B2
(45) Date of Patent: Jun. 16, 2026

(54) ELECTRO-OPTICAL DEVICE

(71) Applicant: Taiwan Semiconductor Manufacturing Company, Ltd., Hsinchu (TW)

(72) Inventors: Shuen-Shin Liang, Hsinchu County (TW); Tsung-Fu Tsai, Changhua County (TW); Szu-Wei Lu, Hsinchu City (TW); Chung-Shi Liu, Hsinchu City (TW); Chen-Hua Yu, Hsinchu City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 267 days.

(21) Appl. No.: 18/494,750

(22) Filed: Oct. 25, 2023

(65) Prior Publication Data

US 2025/0138345 A1     May 1, 2025

(51) Int. Cl.
*G02F 1/01*             (2006.01)

(52) U.S. Cl.
CPC .......... *G02F 1/0113* (2021.01); *G02F 1/0102* (2013.01); *G02F 2201/02* (2013.01); *G02F 2201/128* (2013.01); *G02F 2201/302* (2013.01)

(58) Field of Classification Search
CPC ........ G02F 1/025; G02F 1/035; G02F 1/0356; G02F 1/065; G02F 1/225; G02F 1/2255; G02F 1/2257
See application file for complete search history.

(56) References Cited

U.S. PATENT DOCUMENTS

| | | | | |
|---|---|---|---|---|
| 6,310,700 | B1 * | 10/2001 | Betts | G02F 1/2255 |
| | | | | 359/2 |
| 10,684,530 | B1 * | 6/2020 | Bian | G02F 1/29 |
| 10,895,764 | B1 * | 1/2021 | Sharma | G02F 1/035 |
| 2005/0123242 | A1 * | 6/2005 | Walker | G02F 1/2257 |
| | | | | 385/40 |
| 2006/0067634 | A1 * | 3/2006 | Bull | G02B 6/14 |
| | | | | 385/27 |
| 2015/0346520 | A1 * | 12/2015 | Lee | G02F 1/025 |
| | | | | 385/2 |
| 2016/0077293 | A1 * | 3/2016 | Jou | G02B 6/136 |
| | | | | 438/24 |
| 2021/0157177 | A1 * | 5/2021 | Kharel | G02F 1/0316 |
| 2021/0341813 | A1 * | 11/2021 | Nakamura | G02F 1/2255 |

(Continued)

FOREIGN PATENT DOCUMENTS

| | | |
|---|---|---|
| CN | 103018929 | 4/2013 |
| CN | 104155719 | 11/2014 |
| CN | 109686658 | 3/2021 |

(Continued)

OTHER PUBLICATIONS

"Office Action of Taiwan Counterpart Application", issued on Oct. 30, 2024, p. 1-p. 4.

*Primary Examiner* — Michael Stahl
(74) *Attorney, Agent, or Firm* — JCIPRNET

(57)         ABSTRACT
An electro-optical device includes a waveguide and a first electrode and a second electrode. The first electrode and the second electrode at first and second sides of the waveguide, wherein the first electrode and the second electrode directly contact and extend beyond the first and second sides of the waveguide respectively.

20 Claims, 24 Drawing Sheets

(56) References Cited

U.S. PATENT DOCUMENTS

2024/0219803 A1 * 7/2024 Meighan ................. G02F 1/025
2025/0208446 A1 * 6/2025 Licausi ................. G02F 1/0151

FOREIGN PATENT DOCUMENTS

CN        112596277      8/2023
TW        202336474      9/2023
WO       2022001566      1/2022
WO   WO 2025/069334 A1 *  4/2025

* cited by examiner

M

130a

124a

P2

130b

124b

P1

120a  110s1  110s2  112b  112a  120b

110

M

130a

124a

130b

124b

120a

120b 1201  110s1  110s2  112b  112a  1201

110

ELECTRO-OPTICAL DEVICE

BACKGROUND

Electro-optical devices such as modulators are often used as components in integrated optical circuits, which integrate multiple photonic functions. The modulators are used to modulate light. Although the existing modulator structures have been generally adequate for their intended purposes, they have not been entirely satisfactory in all respects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
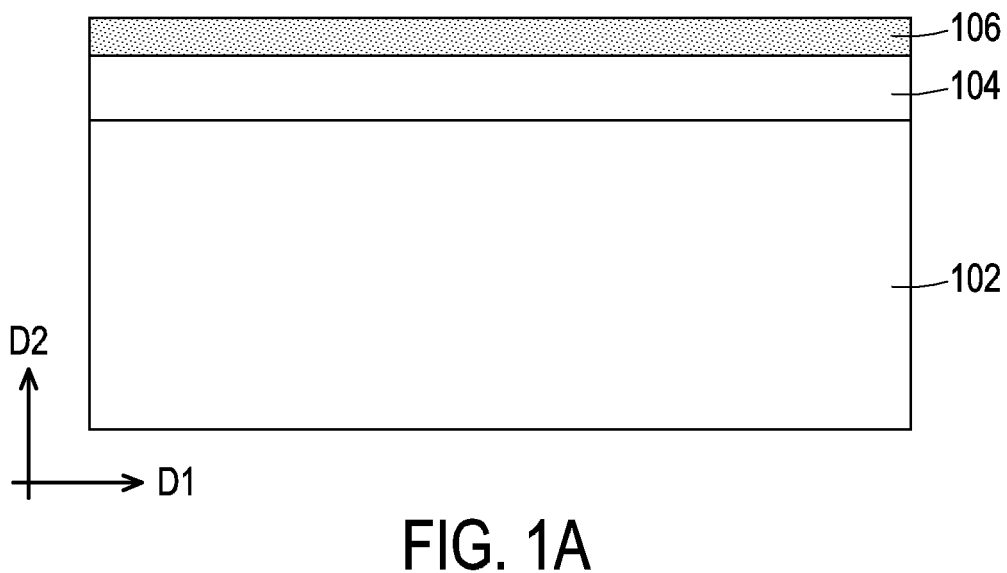
FIG. 1A to FIG. 1I are schematic cross-sectional views of various stages in a method of forming an electro-optical device according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2A:
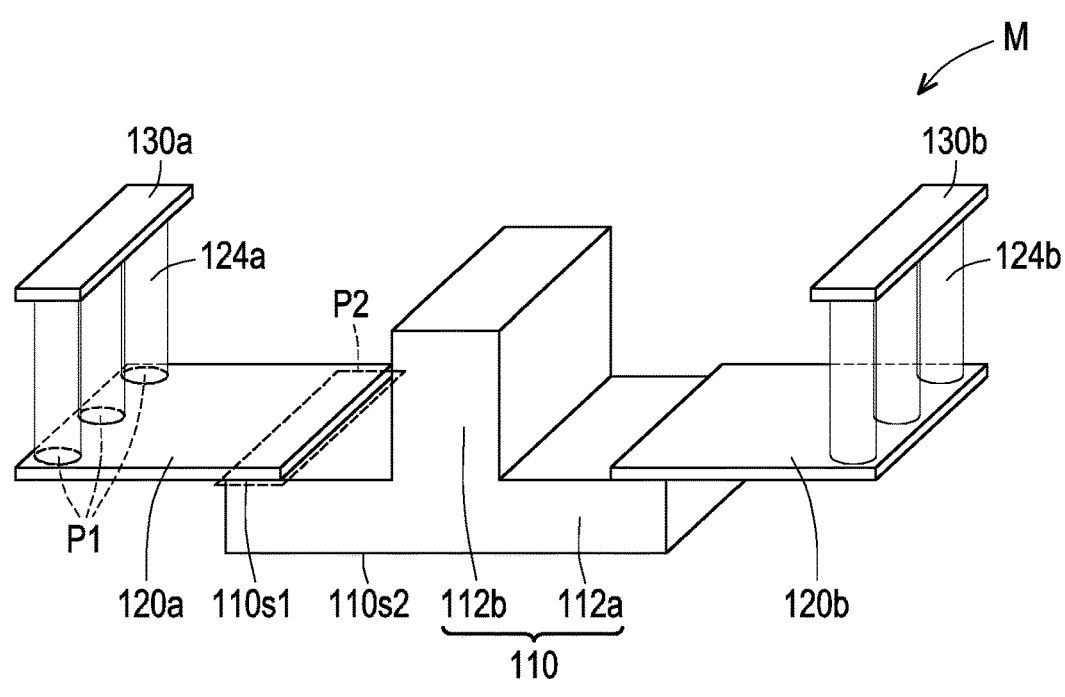
FIG. 2A to FIG. 2C are three-dimensional views of an electro-optical device according to some embodiments.
Figure 2B:
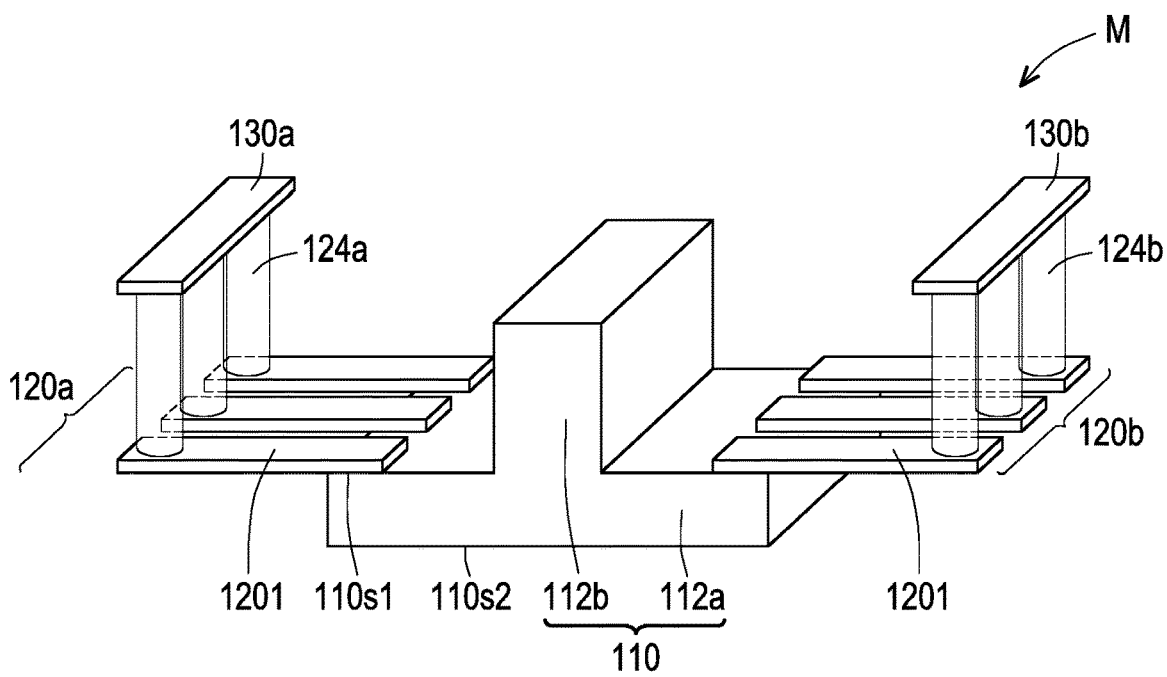
Figure 2C:
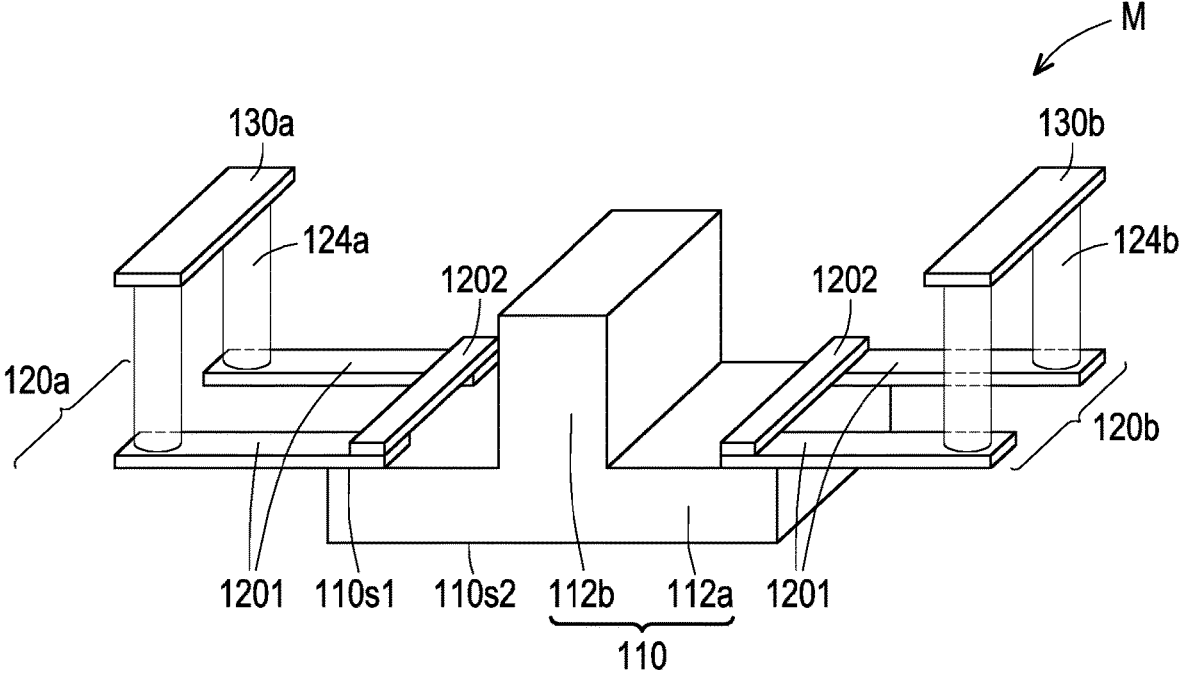
Figure 3:
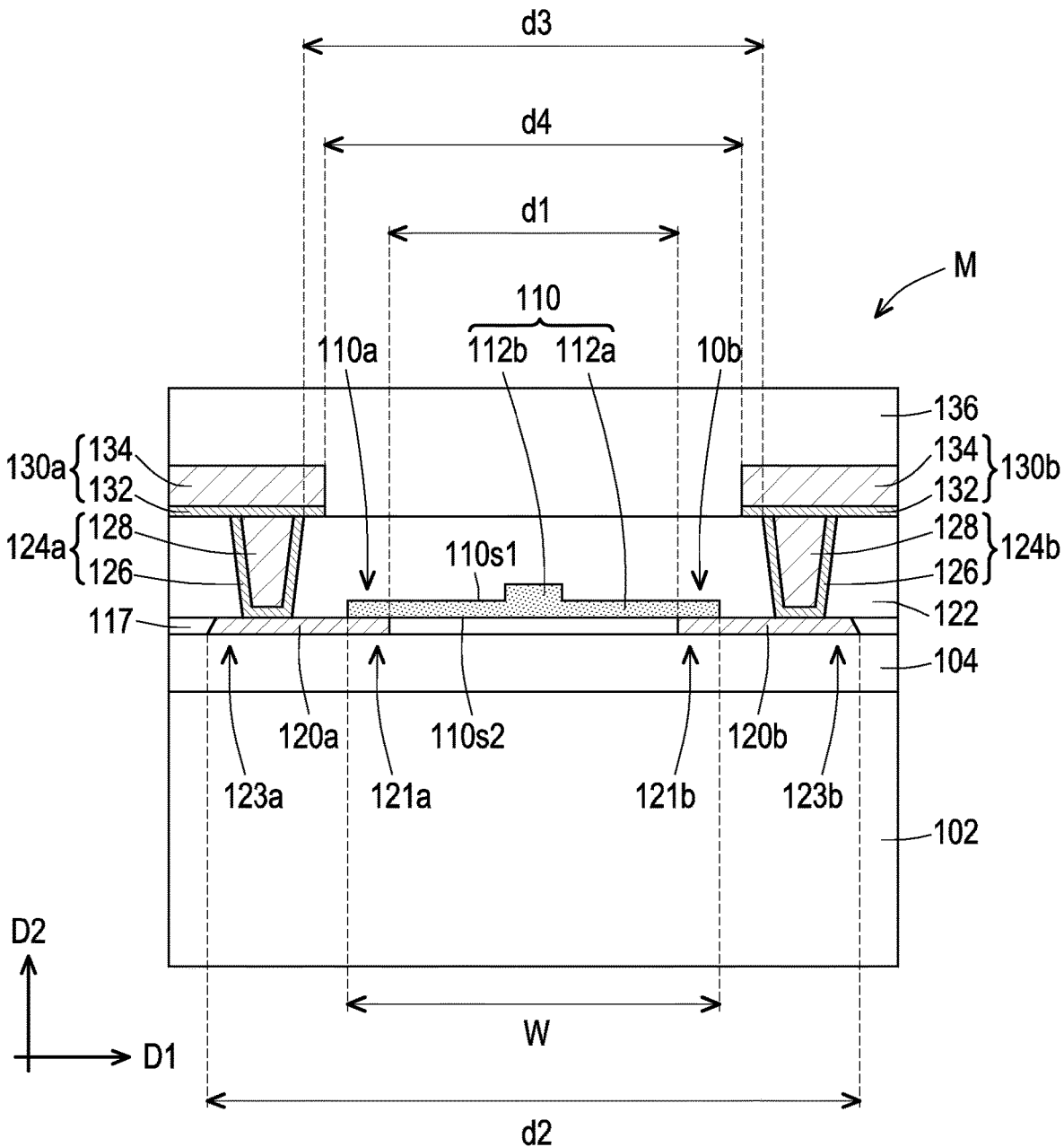
FIG. 3 is a cross-sectional view of an electro-optical device according to some embodiments.

FIG. 1A to FIG. 1I are schematic cross-sectional views of various stages in a method of forming an electro-optical device according to some embodiments. FIG. 2A to FIG. 2C and FIG. 4A to FIG. 4C are three-dimensional views of an electro-optical device according to some embodiments, and FIG. 3 is a cross-sectional view of an electro-optical device according to some embodiments.

Referring to FIG. 1A, an insulating layer 104 is formed over a substrate 102, and a waveguide layer 106 is formed over the insulating layer 104. In some embodiments, the substrate 102, the insulating layer 104, and the waveguide layer 106 are respectively extended along a direction D1 (e.g., x direction or y direction), and the substrate 102, the insulating layer 104, and the waveguide layer 106 are stacked along a direction D2 (e.g., z direction) substantially perpendicular to the direction D2. The direction D2 may be also referred to as a stacking direction. The substrate 102 may be a semiconductor, glass, ceramic or dielectric substrate. For example, the substrate 102 includes a bulk semiconductor or the like, which may be doped (e.g., with a p-type or an n-type dopant) or undoped. In some embodiments, the substrate 102 is a wafer, such as a silicon wafer or other type of semiconductor wafer. Other substrate materials, such as a multi-layered or gradient substrate may also be used. In some embodiments, the material of the substrate 102 includes silicon, germanium, a compound semiconductor including silicon carbide, gallium arsenic, gallium phosphide, indium phosphide, indium arsenide, and/or indium antimonide, an alloy semiconductor including SiGe, GaAsP, AlInAs, AlGaAs, GaInAs, GaInP, and/or GaInAsP, the like, or combinations thereof. The insulating layer 104 may be a silicon oxide or the like. In some embodiments, the insulating layer 104 has a thickness between about 0.5 μm and about 4 μm. The insulating layer 104 may be deposited by chemical vapor deposition CVD, physical vapor deposition (PVD), thermal oxidation, the like, or combinations thereof.

The waveguide layer 106 may include a material such as silicon, silicon oxide, silicon oxynitride, the like, or combinations thereof. The waveguide layer 106 may have a thickness between about 0.1 μm and about 1.5 μm. The waveguide layer 106 may be formed directly on the insulating layer 104 by a process such as epitaxial growth process or formed by bonding a pre-formed semiconductor layer onto the insulating layer 104. In an embodiment in which the waveguide layer 106 is formed by bonding, the pre-formed semiconductor layer may undergo a thickness reduction process such as CMP after bonding. In some embodiments, the waveguide layer 106 is a silicon layer and includes doped silicon or undoped silicon. In such embodiments, the substrate 102, the insulating layer 104, and the waveguide layer 106 may be formed as a buried oxide ("BOX") substrate.

Figure 1B:
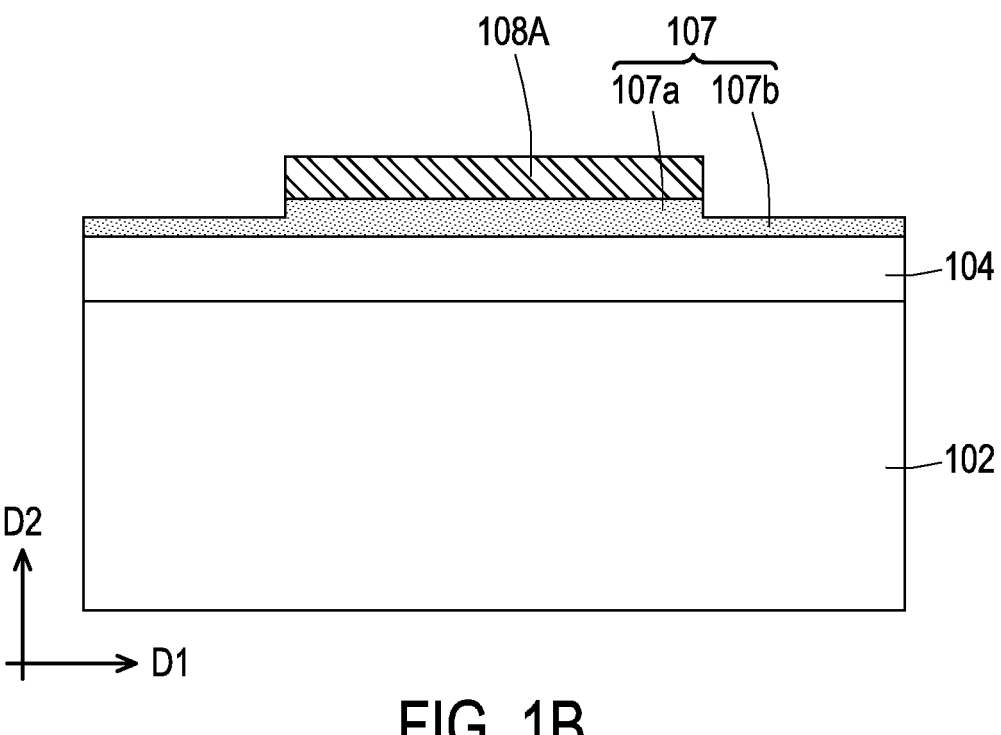
Figure 1C:
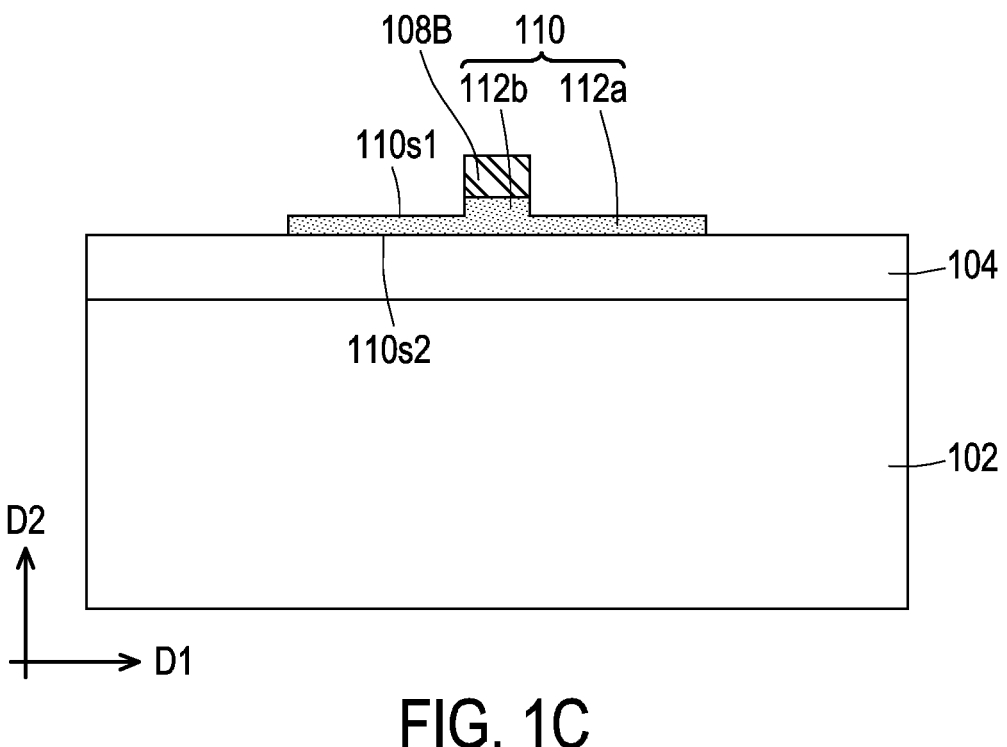

Referring to FIGS. 1B and 1C, the waveguide layer 106 is patterned to form a waveguide 110. The waveguide layer 106 may be patterned using photolithography and etching techniques. For example, as shown in FIG. 1B, a hard mask layer 108A is formed over the waveguide layer 106 and patterned. Then, the waveguide layer 106 may be patterned with the hard mask layer 108A as a mask, by using one or more etching techniques, such as dry etching and/or wet etching techniques. In some embodiments, the patterned waveguide layer 107 has a thicker portion 107a at the center and a thinner portion 107b at the periphery. Then, the hard mask layer 108A may be removed, and another hard mask layer 108B may be formed over the patterned waveguide layer 107 as shown in FIG. 1C. Similarly, the waveguide layer 107 may be patterned with the hard mask layer 108B as a mask, by using one or more etching techniques, such as dry etching and/or wet etching techniques. In some embodiments, the thinner portion 107b of the patterned waveguide layer 107 is removed, and the thicker portion 107a of the waveguide layer 107 is patterned to form the waveguide 110 having a ridge structure. Then, the hard mask layer 108B is removed.

In some embodiments, the waveguide 110 has a bottom portion 112a and a ridge portion 112b on the bottom portion 112a. The ridge portion 112b may be centered on the bottom portion 112a. The ridge portion 112b may have a thickness larger than the bottom portion 112a. The bottom portion 112a may be also referred to as a lining portion, and the ridge portion 112b may be also referred to as a strip portion. In some embodiments, the waveguide 110 has a first surface 110s1 (e.g., top surface) and a second surface 110s2 (e.g., bottom surface) opposite to the first surface 110s1. The first surface 110s1 includes first surfaces (e.g., top surface) of the bottom portion 112a and the ridge portion 112b, and the second surface 110s2 includes a second surface (bottom surface) of the bottom portion 112a, for example. In some embodiments, the ridge portion 112b is disposed at the first surface 110s1 of the waveguide 110. However, the disclosure is not limited thereto. The waveguide 110 may have any other suitable configuration.

Figure 1D:
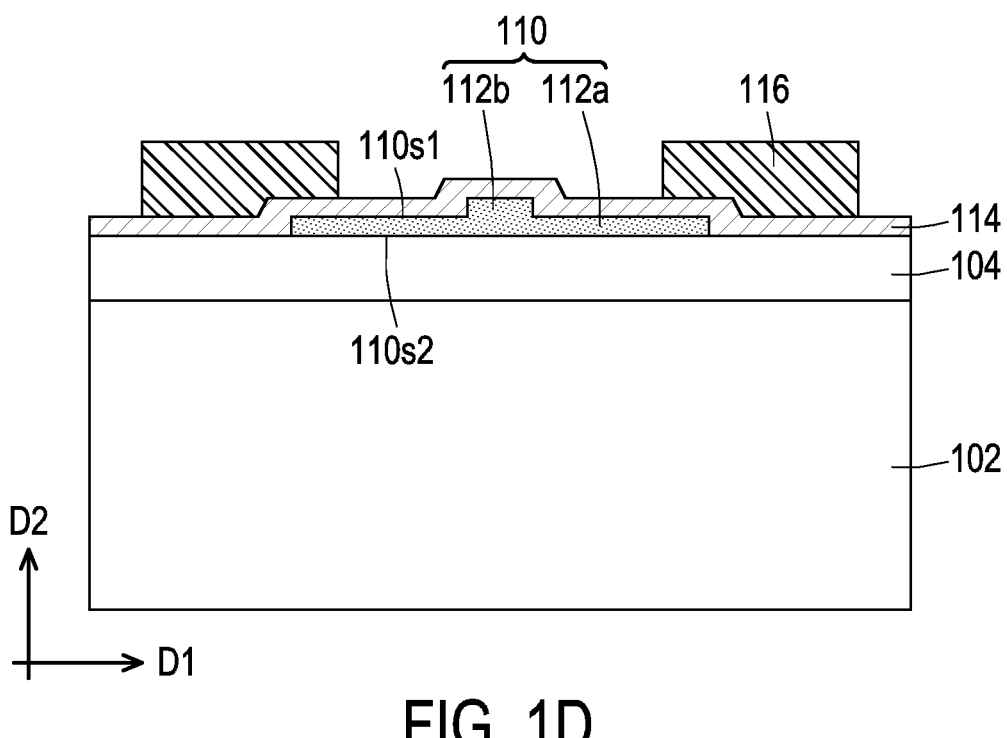
Figure 1E:
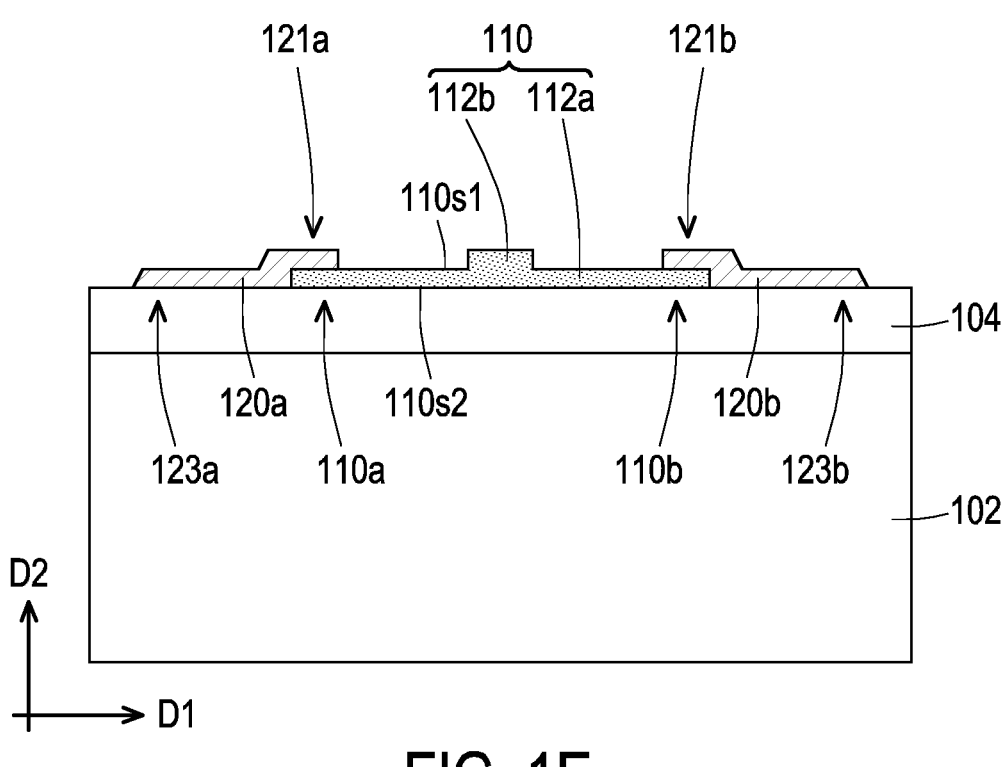

Referring to FIGS. 1D and 1E, a pair of electrodes 120a, 120b are formed on the waveguide 110. As shown in FIG. 1D, a conductive layer 114 is formed on the waveguide 110, and then a patterned hard mask layer 116 is formed on the conductive layer 114. The conductive layer 114 may be conformally formed on the waveguide 110 by a deposition process such as CVD and PVD, and the conductive layer 114 covers the waveguide 110. The hard mask layer 116 exposes portions of the conductive layer 114.

Then, as shown in FIG. 1E, the conductive layer 114 is patterned with the hard mask layer 116 as a mask, by using one or more etching techniques such as dry etching and/or wet etching techniques. The first and second electrodes 120a, 120b are thus formed. In some embodiments, the first electrode 120a and the second electrode 120b are formed at opposite sides 110a, 110b of the waveguide along the direction D1 (e.g., z direction). For example, the first electrode 120a is formed at a first side 110a of the waveguide 110, and the second electrode 120b is formed at a second side 110b opposite to the first side 110a of the waveguide 110. In some embodiments, the first electrode 120a is disposed on the first side 110a of the waveguide 110 and extended onto the insulating layer 104, and similarly, the second electrode 120b is disposed on the second side 110b of the waveguide 110 and extended onto the insulating layer 104. In some embodiments, the first electrode 120a and the second electrode 120b are in direct contact with both the waveguide 110 and the insulating layer 104, respectively. In some embodiments, the first and second electrodes 120a, 120b are separated from the ridge portion 112b. For example, the ridge portion 112b is centered between the first and second electrodes 120a, 120b. In some embodiments, a thickness of the first and second electrode 120a, 120b is in a range of 0.2 μm to 2 μm. In some embodiments, the ridge portion 112b of the waveguide 110 and the electrodes 120a, 120b are disposed at the same surface (i.e., first surface 110s1) of the waveguide 110.

Figure 1F:
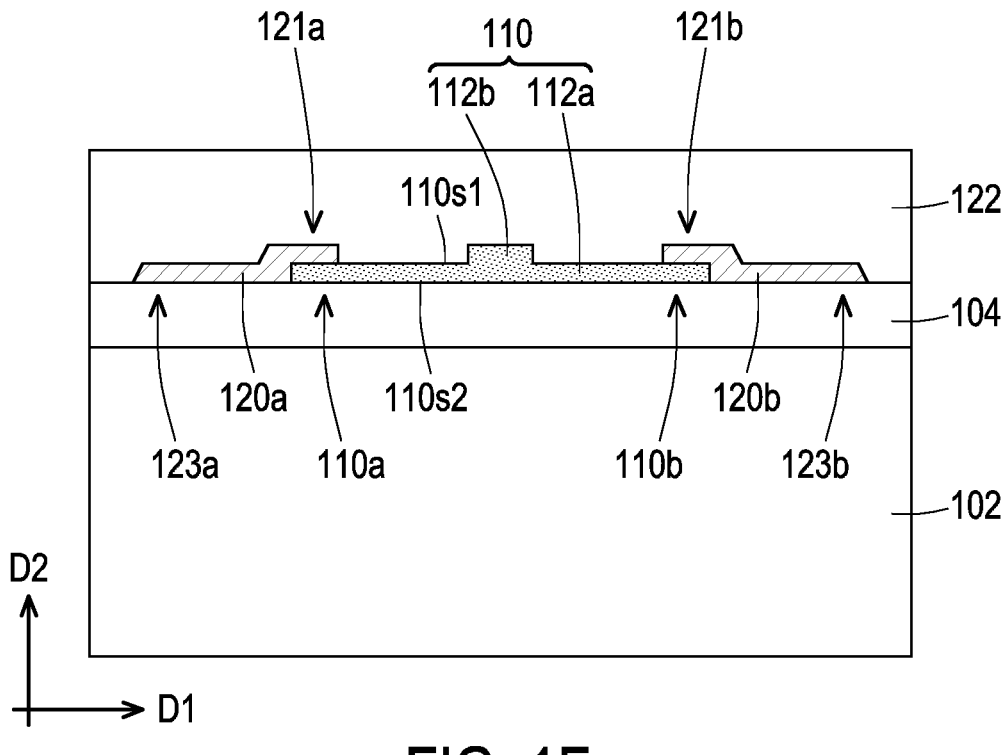

Referring to FIG. 1F, a dielectric layer 122 is formed over the substrate 102, to cover the waveguide 110 and the first and second electrodes 120a, 120b. The material of the dielectric layer 122 includes oxides such as silicon oxide or aluminum oxide, nitrides such as silicon nitride, carbides such as silicon carbide, the like or combinations thereof such as silicon oxynitride, silicon oxycarbide, silicon carbonitride, silicon oxycarbonitride. In alternative embodiments, the dielectric layer 122 includes low-k dielectric materials such as PSG, BSG, BPSG and USG, a polymer such as polybenzoxazole (PBO), polyimide and a benzocyclobutene (BCB) based polymer, the like, or combinations thereof.

Figure 1G:
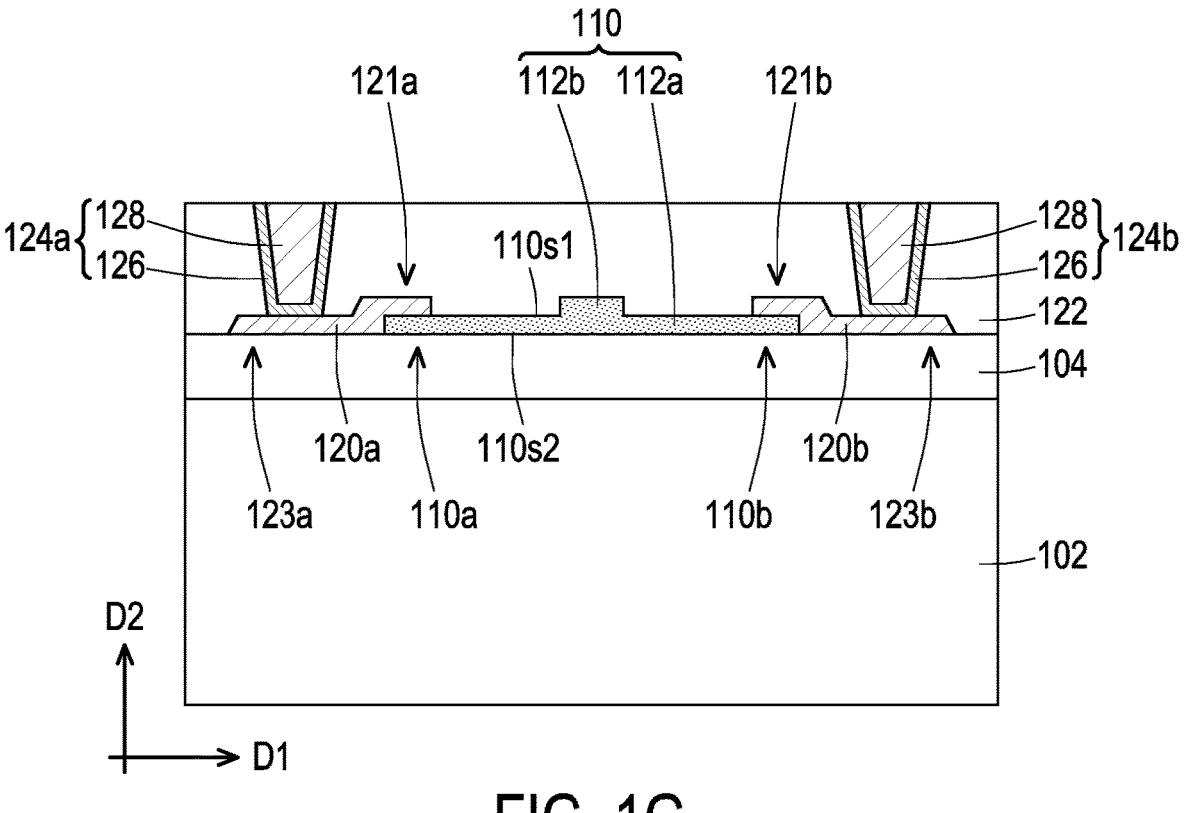

Referring to FIG. 1G, first and second vias 124a, 124b are formed in the dielectric layer 122, to electrically connect to the first and second electrodes 120a, 120b respectively. The first and second vias 124a, 124b may has a height larger than a width (or diameter), and thus an aspect ratio thereof may be larger than 1. In some embodiments, the first and second vias 124a, 124b may be also referred to as contacts or conductive pillars. The first and second vias 124a, 124b may be disposed on portions (e.g., sides, ends or edges) of the first and second electrodes 120a, 120b outside the waveguide 110. Thus, the first and second vias 124a, 124b may be not overlapped with the waveguide 110 therebelow along the stacking direction D2 (e.g., x direction) of the waveguide 110 and the first and second electrodes 120a, 120b. The first and second vias 124a, 124b may be formed by a damascene process, e.g., dual damascene, single damascene, or the like. For example, openings for the first and second vias 124a, 124b are first formed in the dielectric layer 122, using acceptable photolithography and etching techniques. A liner layer, such as a glue layer, a diffusion barrier layer, an adhesion layer, or the like may be conformally formed over the openings, and a conductive layer may then be formed to fill up the openings. Then, the liner layer and the conductive layer outside the openings may be removed by using a planarization process such as CMP, so as to form the first and second vias 124a, 124b. In some embodiments, top surfaces of the first and second vias 124a, 124b are substantially coplanar with a top surface of the dielectric layer 122.

In some embodiments, the first and second vias 124a, 124b include a liner layer 126 and a conductive layer 128. The material of the liner layer 126 may be TaN, Ta, TiN, Ti, CoW, the like or combinations thereof, and may be formed in the openings by a deposition process such as ALD or the like. The material of the conductive layer 128 may be a metal, such as copper, cobalt, aluminum, gold, the like or combinations thereof, and may be formed in the openings by a deposition process such as CVD, PVD or the like. In alternative embodiments, the first and second vias 124a, 124b may include other suitable structure. For example, the liner layer 126 is omitted.

Figure 1H:
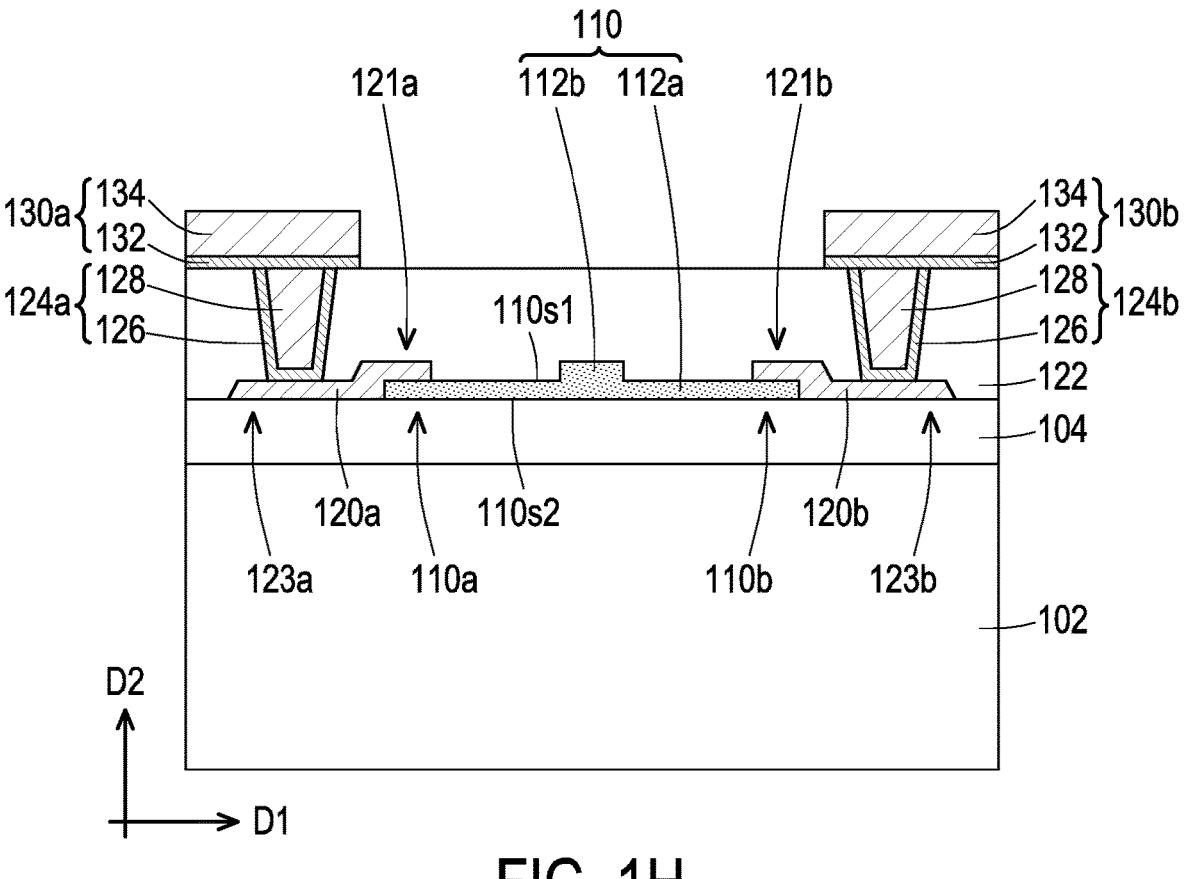

Referring to FIG. 1H, a plurality of first and second conductive connectors 130a, 130b are formed to electrically connect the first and second vias 124a, 124b. In some embodiments, the first and second conductive connectors 130a, 130b are pads, bumps, the like, or combinations thereof. The first and second conductive connectors 130a, 130b may be formed using acceptable depositing, photolithography and etching techniques. In some embodiments, the first and second conductive connectors 130a. 130b respectively include a liner layer 132 and a conductive layer 134. The formation and material of the liner layer 132 and the conductive layer 134 may be similar to the liner layer 126 and the conductive layer 128 of the first and second vias 124a, 124b and thus details are omitted. However, the first and second conductive connectors 130a, 130b may have other suitable configurations.

Figure 1I:
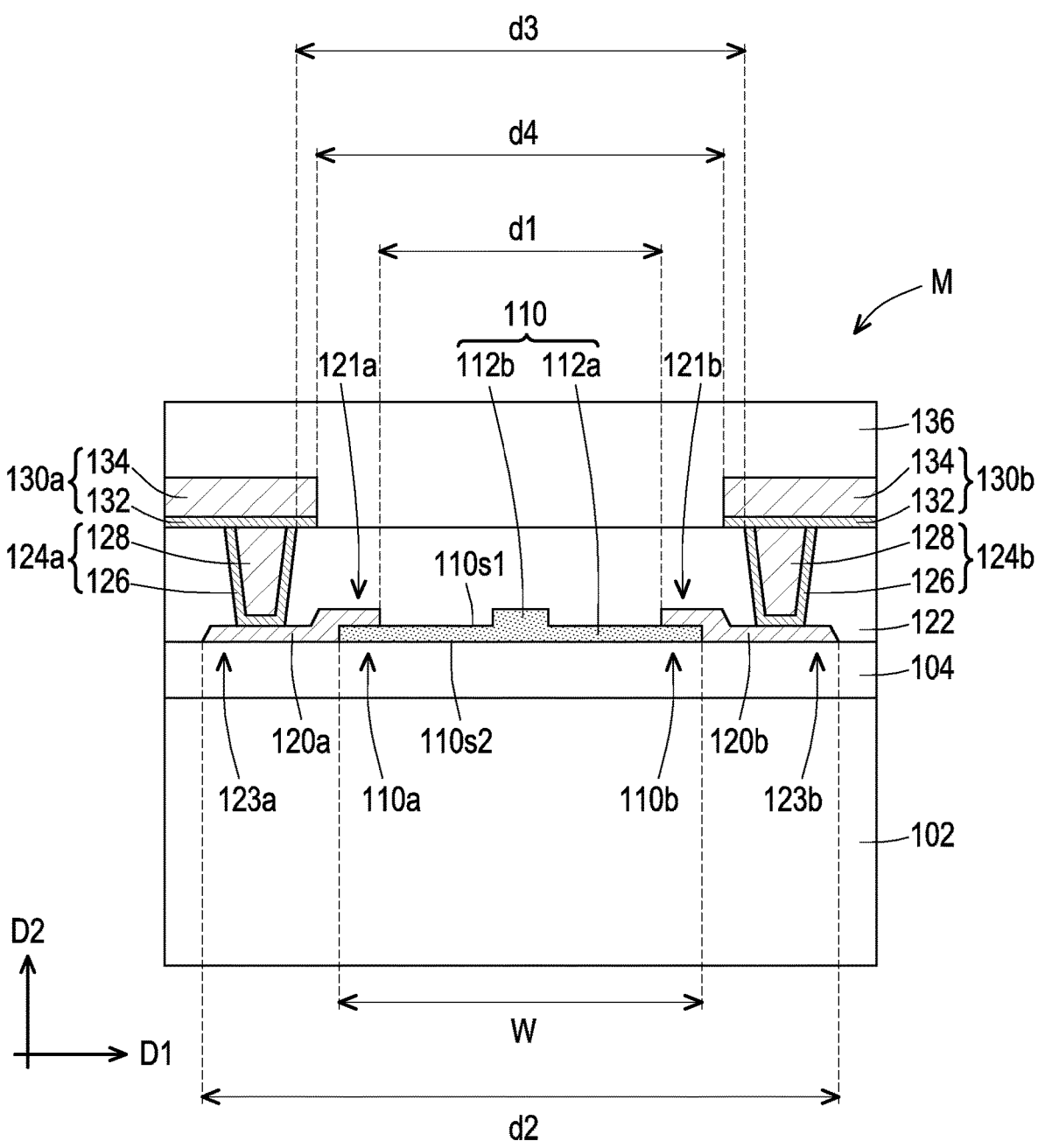

Referring to FIG. 1I, a dielectric layer 136 is formed over the substrate 102, and a modulator M is formed. The material of the dielectric layer 136 includes oxides such as silicon oxide or aluminum oxide, nitrides such as silicon nitride, carbides such as silicon carbide, the like or combinations thereof such as silicon oxynitride, silicon oxycarbide, silicon carbonitride, silicon oxycarbonitride. In alternative embodiments, the dielectric layer 136 includes low-k dielectric materials such as PSG, BSG, BPSG and USG, a polymer such as polybenzoxazole (PBO), polyimide and a benzocyclobutene (BCB) based polymer, the like, or combinations thereof. In some embodiments, after forming the dielectric layer 136, the substrate 102 may be removed using a planarization process (e.g., a CMP or grinding process), an etching process, or a combination. In some embodiments, the insulating layer 104 may be thinned after the substrate 102 is removed. The insulating layer 104 may be thinned using a planarization process, to form thinned insulating layer 104'. In some embodiments, the thinned insulating layer 104 may have a thickness between about 400 nm and about 600 nm. In alternative embodiments, the dielectric layer 136 may be omitted or partially removed in subsequent process, to expose the conductive connectors 130a, 130b. However, the disclosure is not limited thereto.

In some embodiments, the electrode 120a, 120b is disposed between the waveguide 110 and the via 124a, 124b, and the electrode 120a, 120b connects to the waveguide 110 through one end 121a, 121b and connects to the via 124a, 124b through the other end 123a, 123b different from the end 121a, 121b. In some embodiments, the electrode 120a, 120b extends from and beyond the side 110a, 110b of the waveguide 110. Thus, portions of the electrodes 120a, 120b may be far away from the waveguide 110, and the vias 124a, 124b and the conductive connectors 130a. 130b may be farther away from the waveguide 110. For example, the portions of the electrodes 120a, 120b, the vias 124a. 124b and the conductive connectors 130a, 130b are not overlapped with the waveguide 110 along the stacking direction D2. In some embodiments, projections (e.g., vertical projections) of the portions of the electrodes 120a, 120b, the vias 124a, 124b and the conductive connectors 130a, 130b onto the substrate 102 are separated from a projection (e.g., vertical projection) of the waveguide 110 onto the substrate 102. In some embodiments, projections (e.g., vertical projections) of the vias 124a, 124b and the conductive connectors 130a, 130b onto the electrodes 120a, 120b are separated from a projection (e.g., vertical projection) of the waveguide 110 onto the electrodes 120a, 120b. For example, as shown in FIG. 2A, the projections (e.g., vertical projections) P1 of the vias 124a, 124b onto the electrode 120a are separated from the projection (e.g., vertical projection) P2 of the waveguide 110 onto the electrode 120a. Accordingly, the portions of the electrodes 120a, 120b, the vias 124a, 124b and the conductive connectors 130a, 130b may be disposed at locations farther away from the waveguide 110.

In some embodiments, a smallest distance d1 between the first and second electrode 120a, 120b along the direction D1 is in a range of 4 μm to 40 μm, and a largest distance d2 between the first and second electrode 120a, 120b along the direction D1 is larger than the distance d1 and is in a range of 6 μm to 60 μm. The smallest distance d1 between electrodes 120a, 120b is smaller than a total width W of the waveguide 110 along the direction D1, and the largest distance d2 is larger than the total width W of the waveguide 110 along the direction D1. For example, a smallest distance d3 between the vias 124a, 124b is larger than the total width W of the waveguide 110 along the direction D1. In some embodiments, a smallest distance d4 between the conductive connectors 130a, 130b is larger than the total width W of the waveguide 110 along the direction D1.

In some embodiments, when a drive voltage and a ground voltage are applied through the electrodes 120a, 120b to the waveguide 110, an electric field is generated between the electrodes 120a, 120b. For example, one of the electrodes 120a, 120b is a signal electrode and is applied with a drive voltage, and the other of the electrodes 120a. 120b is a ground electrode and is applied with a ground voltage. The light beam travelling through the waveguide 110 is modulated by the electric field. In other words, the waveguide 110 provided with the electrodes 120a, 120b forms an electro-optic interaction part of the modulator M in the sense of causing an interaction between light and electric signal.

In some embodiments, by extending the electrodes 120a, 120b away from the waveguide 110, the electrodes 120a, 120b, the vias 124a, 124b and the conductive connectors 130a. 130b may be disposed at locations farther away from the location where the light beam travels. Accordingly, the electrodes 120a, 120b, the vias 124a, 124b and the conductive connectors 130a, 130b are prevented from being exposed in an electric field generated by the light. Thus, the electric field would not be absorbed by the electrodes 120a, 120b, the vias 124a, 124b and the conductive connectors 130a, 130b, and the extinction of the electric field and the light intensity loss may be reduced.

In some embodiments, the electrodes 120a, 120b may be in a form of plate as shown in FIG. 2A. However, the electrodes 120a, 120b may have other suitable shapes. In an embodiment, as shown in FIG. 2B, each electrode 120a, 120b includes a plurality of sub-electrodes 1201. The sub-electrodes 1201 of the electrode 120a, 120b may be respectively electrically connected to the vias 124a, 124b. For example, one of the sub-electrodes 1201 of the electrode 120a is electrically connected to one of the vias 124a, and one of the sub-electrodes 1201 of the electrode 120b is electrically connected to one of the vias 124b. In some embodiments, the sub-electrode 1201 of the electrode 120a contacts the waveguide 110 and the via 124a, and the sub-electrode 1201 of the electrode 120b contacts the waveguide 110 and the via 124b. In an embodiment, as shown in FIG. 2C, each electrode 120a, 120b includes a plurality of sub-electrodes 1201 and a connecting electrode 1202. The sub-electrodes 1201 of the electrode 120a, 120b may be respectively electrically connected to the vias 124a, 124b. The connecting electrode 1202 of the electrode 120a, 120b may physically connect the sub-electrodes 1201 of the electrode 120a, 120b. In some embodiments, the sub-electrode 1201 is partially disposed on the waveguide 110 and partially disposed outside the waveguide 110, and the connecting electrode 1202 is entirely disposed over the waveguide 110. The connecting electrode 1202 is disposed on the sub-electrode 1201 over the waveguide 110, for example. In some embodiments, the sub-electrodes 1201 as shown in FIG. 2B are respectively in a form of sheet and the sub-electrode 1201 and the connecting electrode 1202 as shown in FIG. 2C are respectively in a form of bar or line. In addition, although three vias 124a, 124b are illustrated in FIG. 2A and FIG. 2B and two vias 124a, 124b are illustrated in FIG. 2A and FIG. 2C, more or less number of vias 124a, 124b may be used. Similarly, each electrode 120a, 120b may have any number and configurations of sub-electrodes 1201 and/or connecting electrode 1202.

Figure 4A:
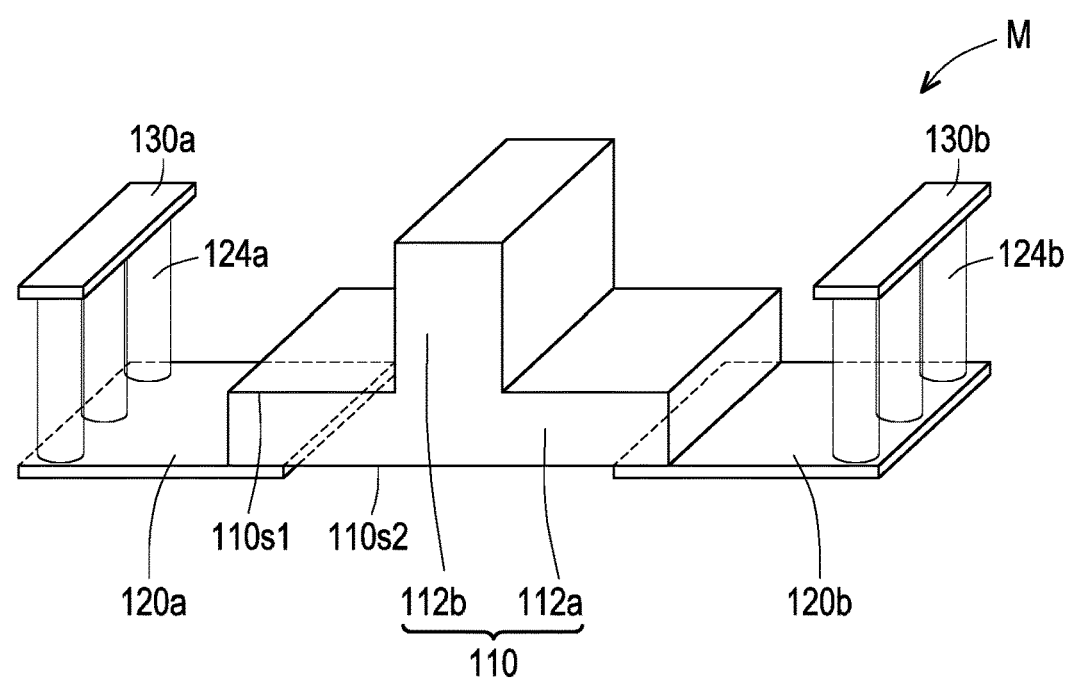
FIG. 4A to FIG. 4C are three-dimensional views of an electro-optical device according to some embodiments.
Figure 4B:
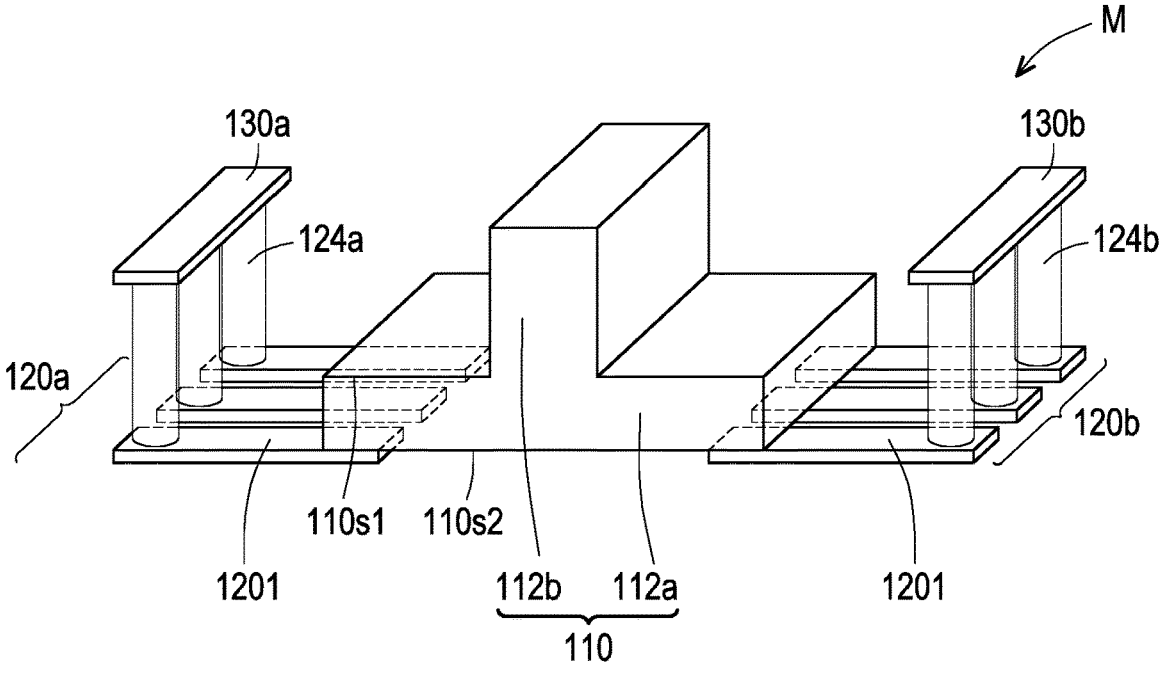
Figure 4C:
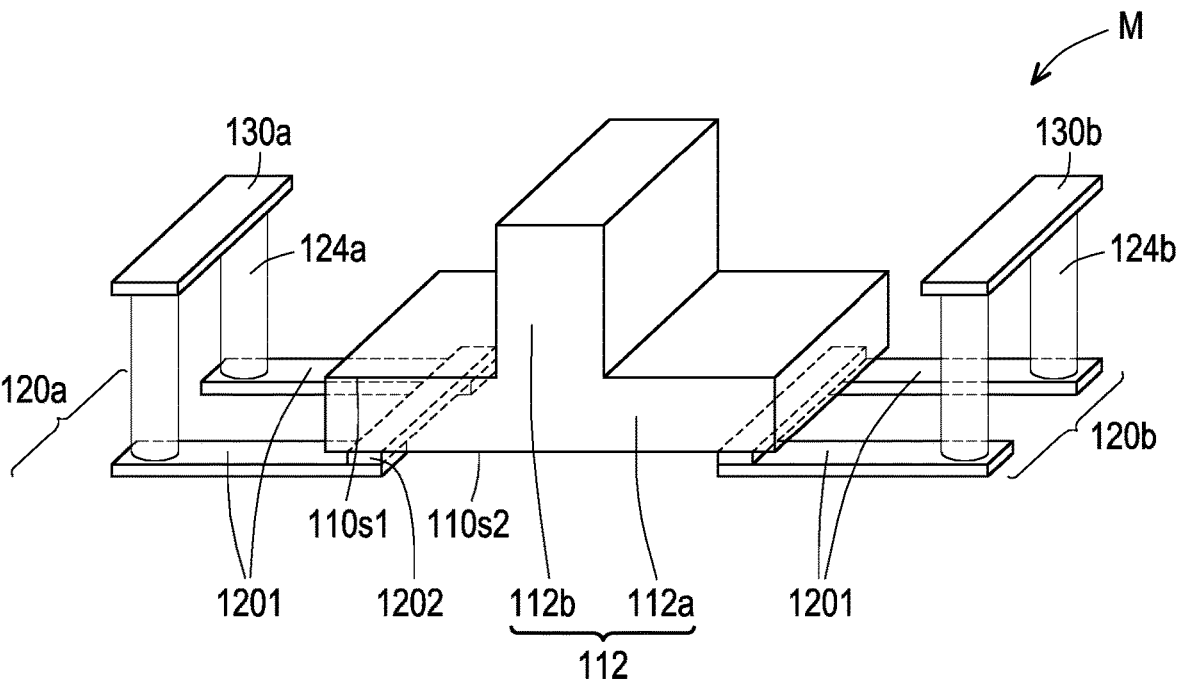

In the above embodiments, the electrodes 120a, 120b are disposed on the waveguide 110, and the waveguide 110 is disposed between the electrode 120a, 120b and the insulating layer 104 (or substrate 102 if present). However, the disclosure is not limited thereto. In some embodiments, as shown in FIG. 3, the electrodes 120a, 120b are disposed below the waveguide 110, and thus the electrode 120a, 120b are disposed between the waveguide 110 and the insulating layer 104 (or substrate 102 if present). In such embodiments, the electrodes 120a, 120b may be formed before the waveguide 110. For example, the electrodes 120a, 120b are formed in a dielectric layer 117 on the insulating layer 104, and then the waveguide 110 is formed on the electrodes 120a, 120b and the dielectric layer 117 and between the electrodes 120a, 120b. After that, the dielectric layer 122 is formed to cover the electrodes 120a, 120b and the waveguide 110, for example. In some embodiments, the ridge portion 112b of the waveguide 110 is disposed at the first surface 110s1 of the waveguide, and the electrodes 120a, 120b are disposed at the second surface 110s2 opposite to the first surface 110s1. As shown in FIGS. 4A to 4C, the electrodes 120a, 120b may be in a form of plate (FIG. 4A), sheet (FIG. 4B), bar (FIG. 4C), the like or combinations thereof. The modulators M of FIGS. 4A to 4C are similar to those of FIGS. 2A to 2C, and difference lies in that the electrodes 120a, 120b of FIGS. 4A to 4C are disposed below the waveguide 110. For example, the electrodes 120a. 120b of FIGS. 4A to 4C are in direct contact with the second surface 110s2 (e.g., bottom surface) of the waveguide 110 while the electrodes 120a, 120b of FIGS. 2A to 2C are in direct contact with the first surface 110s1 (e.g., top surface) of the waveguide 110.

Figure 5A:
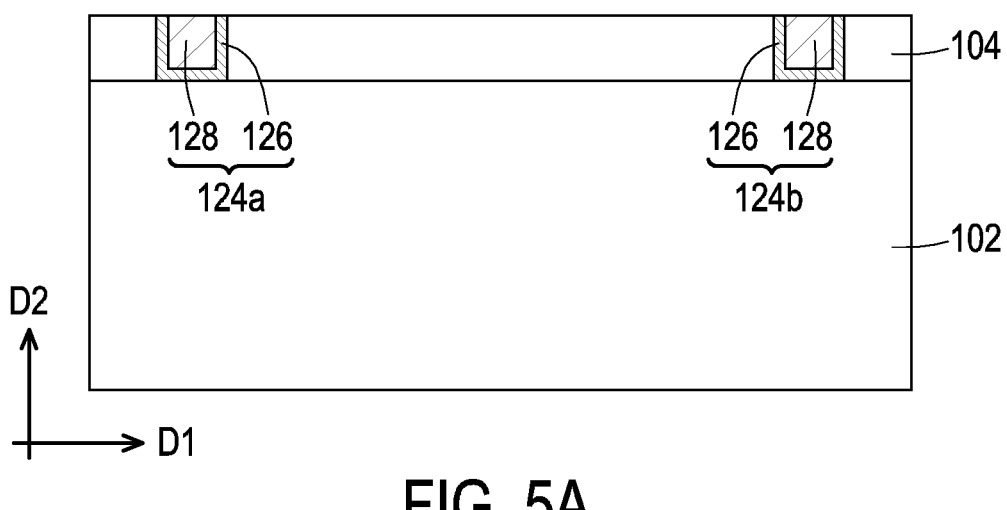
FIG. 5A to FIG. 5E are schematic cross-sectional views of various stages in a method of forming an electro-optical device according to some embodiments.
Figure 5B:
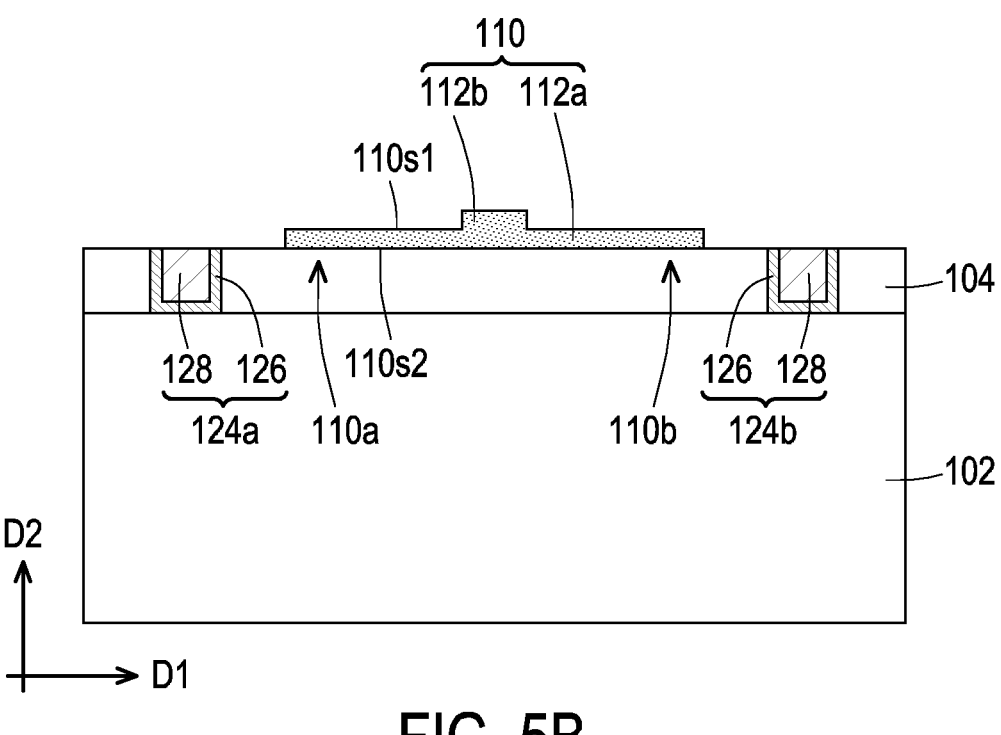
Figure 5C:
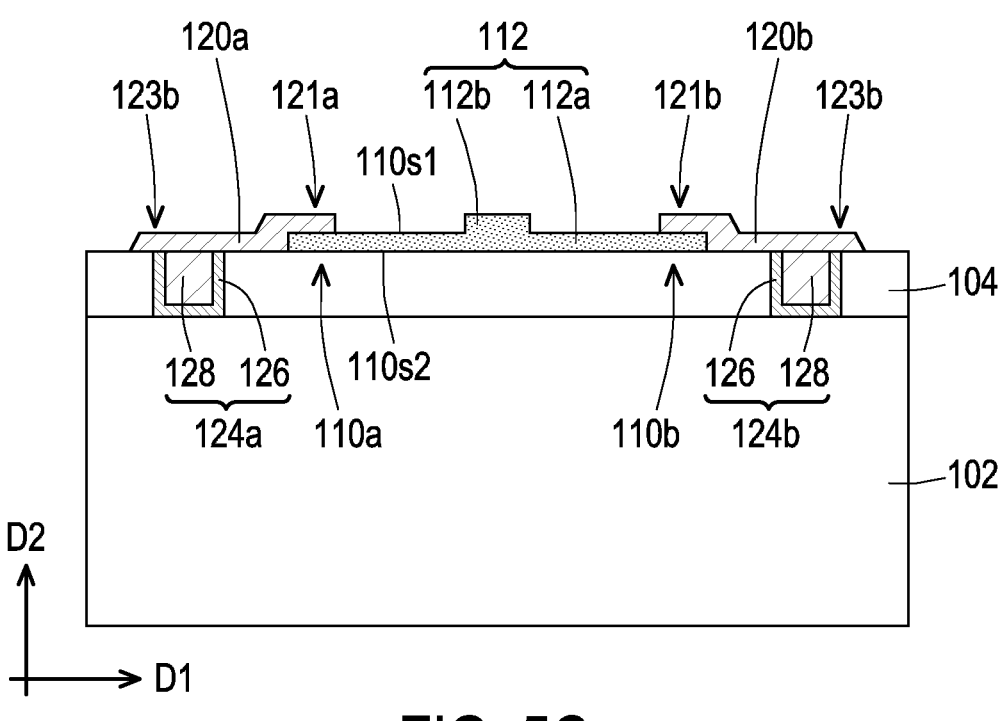
Figure 5D:
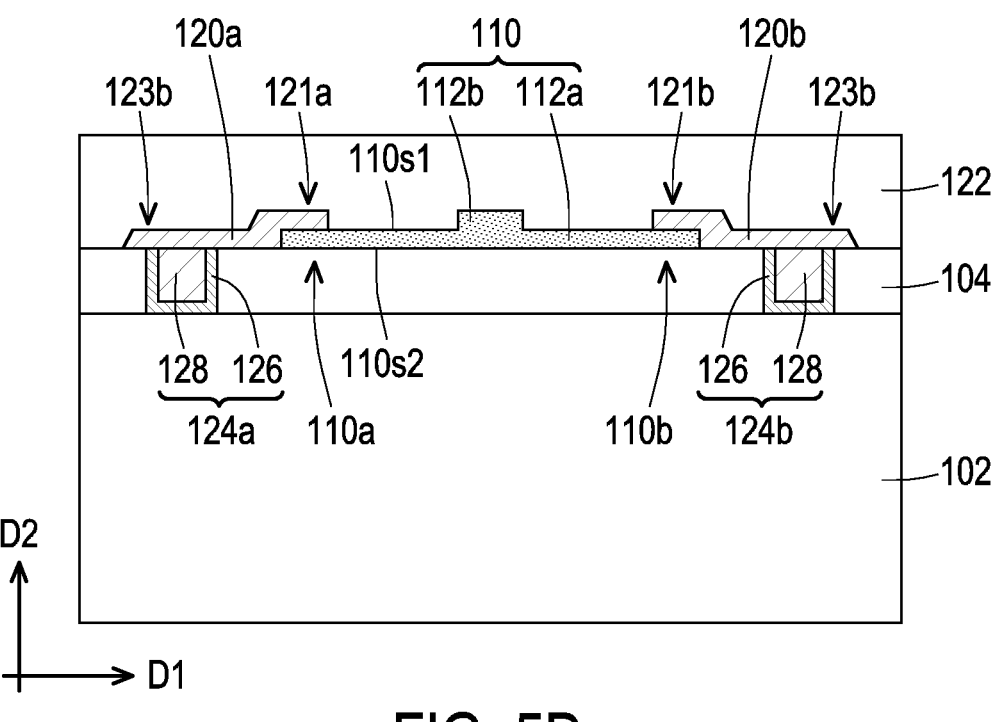
Figure 5E:
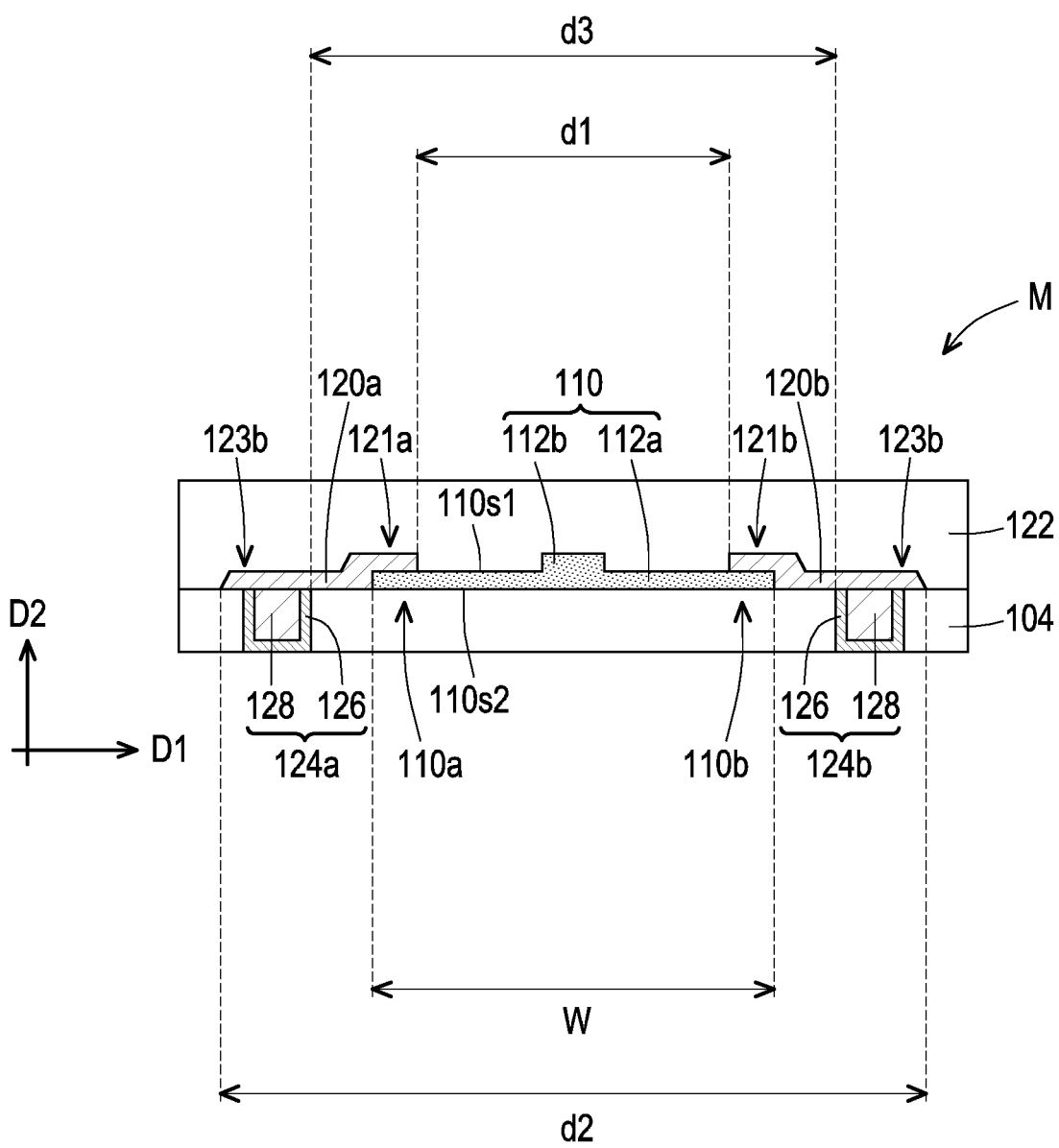

FIG. 5A to FIG. 5E are schematic cross-sectional views of various stages in a method of forming an electro-optical device according to some embodiments. FIG. 6A to FIG. 6C and FIG. 8A to FIG. 8C are three-dimensional views of an electro-optical device according to some embodiments, and FIG. 7 is a cross-sectional view of an electro-optical device according to some embodiments. The structure of the modulator of FIG. 5E is similar to that of FIG. 1I, and the difference lies in that the electrodes 120a, 120b are disposed on the vias 124a, 124b and the conductive connectors 130a, 130b are omitted.

Referring to FIG. 5A, an insulating layer 104 is formed over a substrate 102, and first and second vias 124a, 124b are formed in the insulating layer 104. In some embodiments, the vias 124a, 124b are extended through the insulating layer 104 and may be also referred to as through vias. In some embodiments, the substrate 102 and the insulating layer 104 are respectively extended along a direction D1 (e.g., x direction or y direction), and the substrate 102, the insulating layer 104, and the first and second vias 124a. 124b are stacked along a direction D2 (e.g., z direction) substantially perpendicular to the direction D2. The direction D2 may be also referred to as a stacking direction. The materials, formation method and/or structure of the substrate 102, the insulating layer 104 and the vias 124a, 124b are similar to or the same as those described above and thus omitted. For example, the vias 124a, 124b respectively include a liner layer 126 and a conductive layer 128.

Referring to FIG. 5B, a waveguide 110 is formed on the insulating layer 104 between the vias 124a, 124b. The formation method, materials and structure of the waveguide 110 are similar to or the same as those described above and thus omitted. In some embodiments, the waveguide 110 is formed between and separated from the vias 124a, 124b.

Referring to FIG. 5C, first and second electrodes 120a, 120b are formed on the waveguide 110, to electrically connect the vias 124a, 124b. In some embodiments, the electrodes 120a, 120b are formed at opposite sides 110a, 110b along the direction D1, to cover the sides 110a, 110b of the waveguide 110 and the vias 124a, 124b. For example, the first electrode 120a extends beyond the first via 124a from the first side 110a of the waveguide 110, and similarly, the second electrode 120b extends beyond the second via 124b from the second side 110b of the waveguide 110. In some embodiments, the vias 124a, 124b are disposed at opposite sides 110a, 110b of the waveguide 110 along the direction D1. The formation method, materials and structure of the electrodes 120a, 120b are similar to or the same as those described above and thus omitted.

Referring to FIG. 5D, a dielectric layer 122 is formed over the substrate 102, to cover the waveguide 110 and the electrodes 120a, 120b. The formation method and materials of the dielectric layer 122 are similar to or the same as those described above and thus omitted.

Referring to FIG. 5E, the substrate 102 is removed, and a modulator M is formed. In some embodiments, the electrode 120a, 120b is disposed between the waveguide 110 and the via 124a, 124b, and the electrode 120a, 120b connects to the waveguide 110 through one end 121a, 121b and electrically connects to the via 124a, 124b through the other end 123a, 123b different from the end 121a, 121b. In some embodiments, the electrode 120a, 120b extends from and beyond the side 110a, 110b of the waveguide 110. Thus, portions of the electrodes 120a, 120b may be far away from the waveguide 110, and the vias 124a, 124b may be farther away from the waveguide 110. For example, the portions of the electrodes 120a, 120b and the vias 124a, 124b are not overlapped with the waveguide 110 along the stacking direction D2 of the waveguide 110 and the electrodes 120a, 120b. For example, projections (e.g., vertical projections) of the portions of the electrodes 120a, 120b and the vias 124a, 124b onto the substrate 102 are separated from a projection (e.g., vertical projection) of the waveguide 110 onto the substrate 102. In some embodiments, projections (e.g., vertical projections) of the vias 124a, 124b onto the electrodes 120a, 120b are separated from a projection (e.g., vertical projection) of the waveguide 110 onto the electrodes 120a, 120b. That is, the portions of the electrodes 120a, 120b and the vias 124a. 124b may be disposed at locations farther away from the waveguide 110.

In some embodiments, a smallest distance d1 between the first and second electrode 120a, 120b along the direction D1 is in a range of 4 μm to 40 μm, and a largest distance d2 between the first and second electrode 120a, 120b along the direction D1 is larger than the distance d1 and is in a range of 6 μm to 60 μm. The smallest distance d1 between the electrodes 120a, 120b is smaller than a total width W of the waveguide 110 along the direction D1, and the largest distance d2 is larger than the total width W of the waveguide 110 along the direction D1. For example, a smallest distance d3 between the vias 124a, 124b is larger than the total width W of the waveguide 110 along the direction D1.

In some embodiments, when a drive voltage and a ground voltage are applied through the electrodes 120a, 120b to the waveguide 110, an electric field is generated between the electrodes 120a, 120b. For example, one of the electrodes 120a, 120b is a signal electrode and is applied with a drive voltage, and the other of the electrodes 120a, 120b is a ground electrode and is applied with a ground voltage. The light beam travelling through the waveguide 110 is modulated by the electric field. In other words, the waveguide 110 provided with the electrodes 120*a*, 120*b* forms an electrooptic interaction part of the modulator M in the sense of causing an interaction between light and electric signal.

In some embodiments, by extending the electrodes 120*a*, 120*b* away from the waveguide 110, the electrodes 120*a*, 120*b* and the vias 124*a*, 124*b* may be disposed at locations farther away from the location where the light beam travels. Accordingly, the electrodes 120*a*, 120*b* and the vias 124*a*. 124*b* are prevented from being exposed in an electric field generated by the light. Thus, the electric field would not be absorbed the electrodes 120*a*, 120*b* and the vias 124*a*, 124*b*, and the extinction of the electric field and the light intensity loss may be reduced.

Figure 6A:
FIG. 6A to FIG. 6C are three-dimensional views of an electro-optical device according to some embodiments.
Figure 6A:
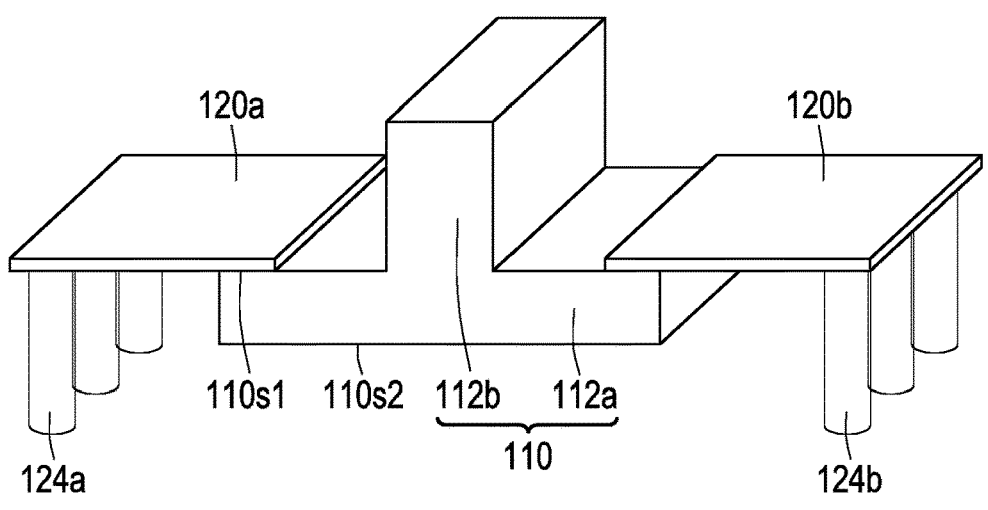
Figure 6B:
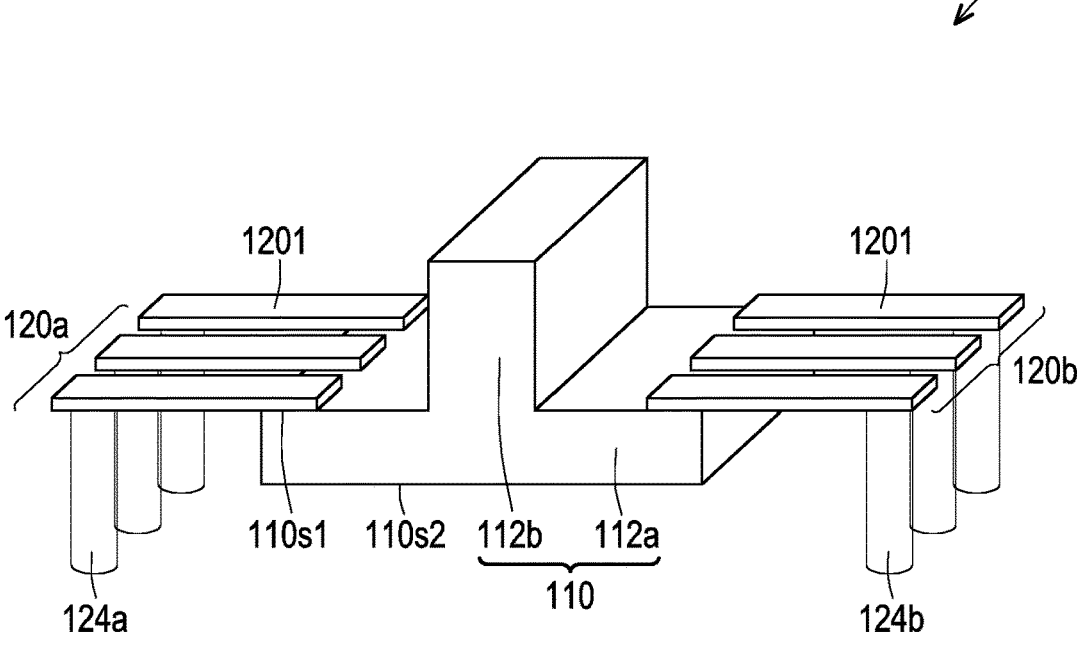
Figure 6C:
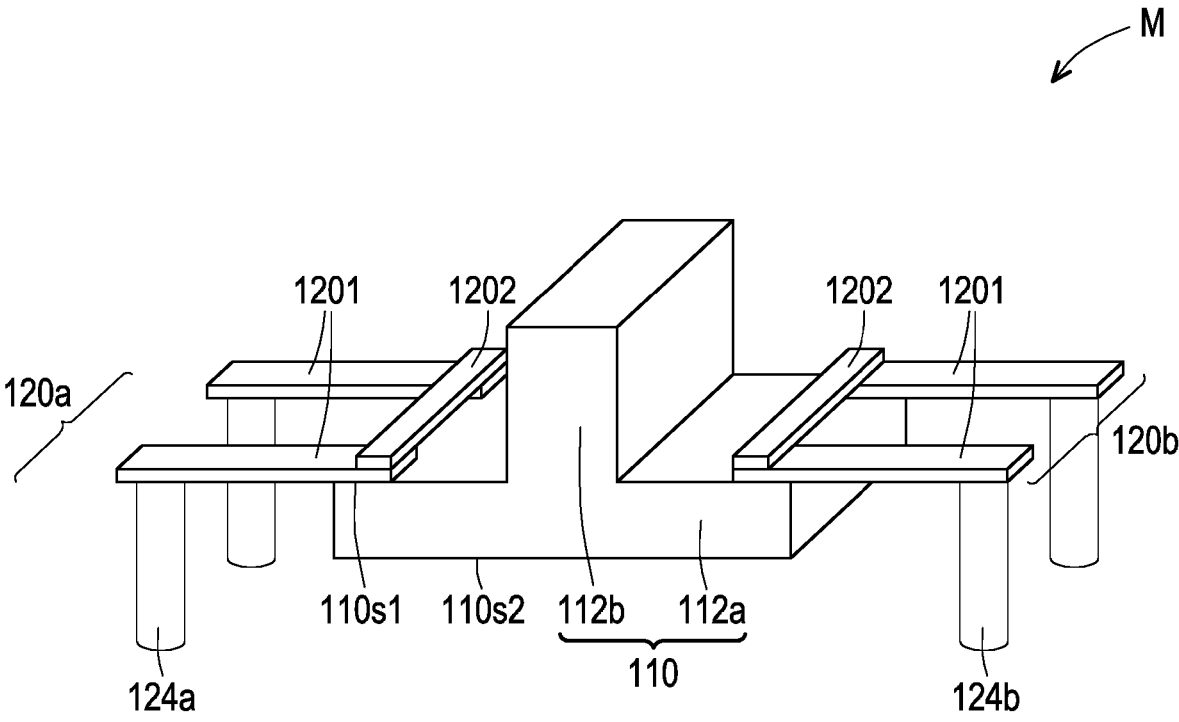
Figure 7:
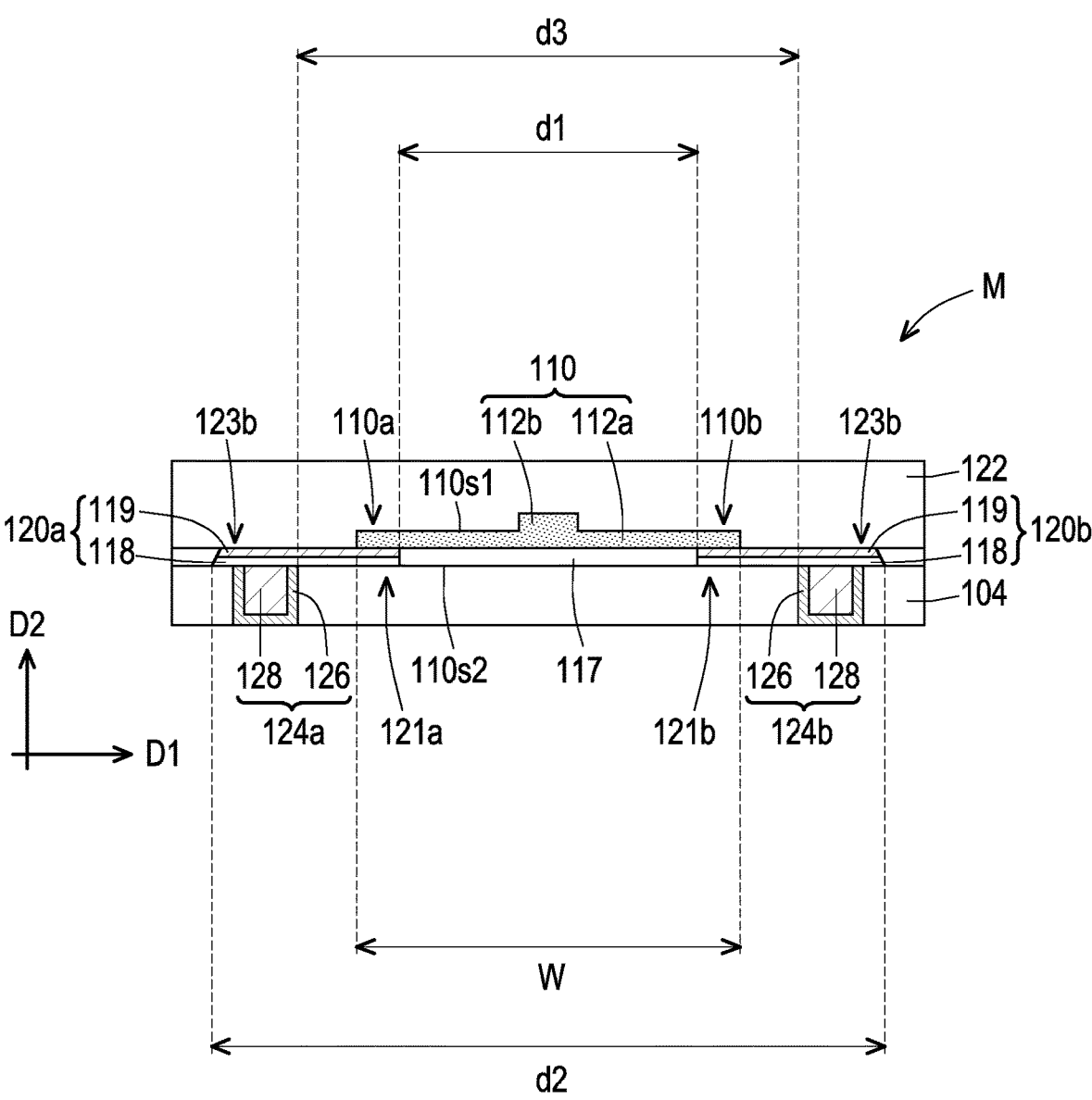
FIG. 7 is a cross-sectional view of an electro-optical device according to some embodiments.

In some embodiments, the electrodes 120*a*, 120*b* may be in a form of plate as shown in FIG. 6A. However, the electrodes 120*a*, 120*b* may have other suitable shapes. In an embodiment, as shown in FIG. 6B, each electrode 120*a*, 120*b* includes a plurality of sub-electrodes 1201. The sub-electrodes 1201 of the electrode 120*a*, 120*b* may be respectively electrically connected to the vias 124*a*, 124*b*. For example, one of the sub-electrodes 1201 of the electrode 120*a* is electrically connected to one of the vias 124*a*, and one of the sub-electrodes 1201 of the electrode 120*b* is electrically connected to one of the vias 124*b*. In some embodiments, the sub-electrode 1201 of the electrode 120*a* contacts the waveguide 110 and the via 124*a*, and the sub-electrode 1201 of the electrode 120*b* contacts the waveguide 110 and the via 124*b*. In an embodiment, as shown in FIG. 6C, each electrode 120*a*, 120*b* includes a plurality of sub-electrodes 1201 and a connecting electrode 1202. The sub-electrodes 1201 of the electrode 120*a*, 120*b* may be respectively electrically connected to the vias 124*a*, 124*b*. The connecting electrode 1202 of the electrode 120*a*, 120*b* may physically connect the sub-electrodes 1201 of the electrode 120*a*, 120*b*. In some embodiments, the sub-electrode 1201 is partially disposed on the waveguide 110 and partially disposed outside the waveguide 110 while the connecting electrode 1202 is entirely disposed over the waveguide 110. The connecting electrode 1202 is disposed on the sub-electrode 1201 over the waveguide 110, for example. In some embodiments, the sub-electrodes 1201 as shown in FIG. 6B are respectively in a form of sheet and the sub-electrode 1201 and the connecting electrode 1202 as shown in FIG. 6C are respectively in a form of bar or line. In addition, although three vias 124*a*, 124*b* are illustrated in FIG. 6A and FIG. 6B and two vias 124*a*, 124*b* are illustrated in FIG. 6A and FIG. 6C, more or less number of vias 124*a*, 124*b* may be used. Similarly, each electrode 120*a*, 120*b* may have any number and configurations of sub-electrodes 1201 and/or connecting electrode 1202.

Figure 8A:
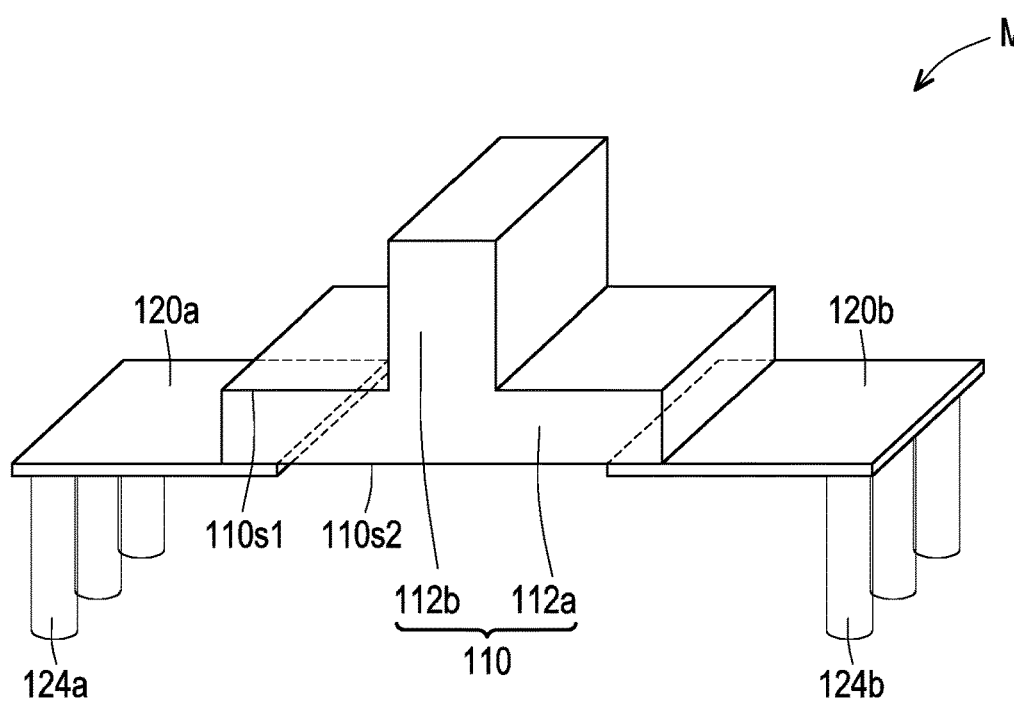
FIG. 8A to FIG. 8C are three-dimensional views of an electro-optical device according to some embodiments.
Figure 8B:
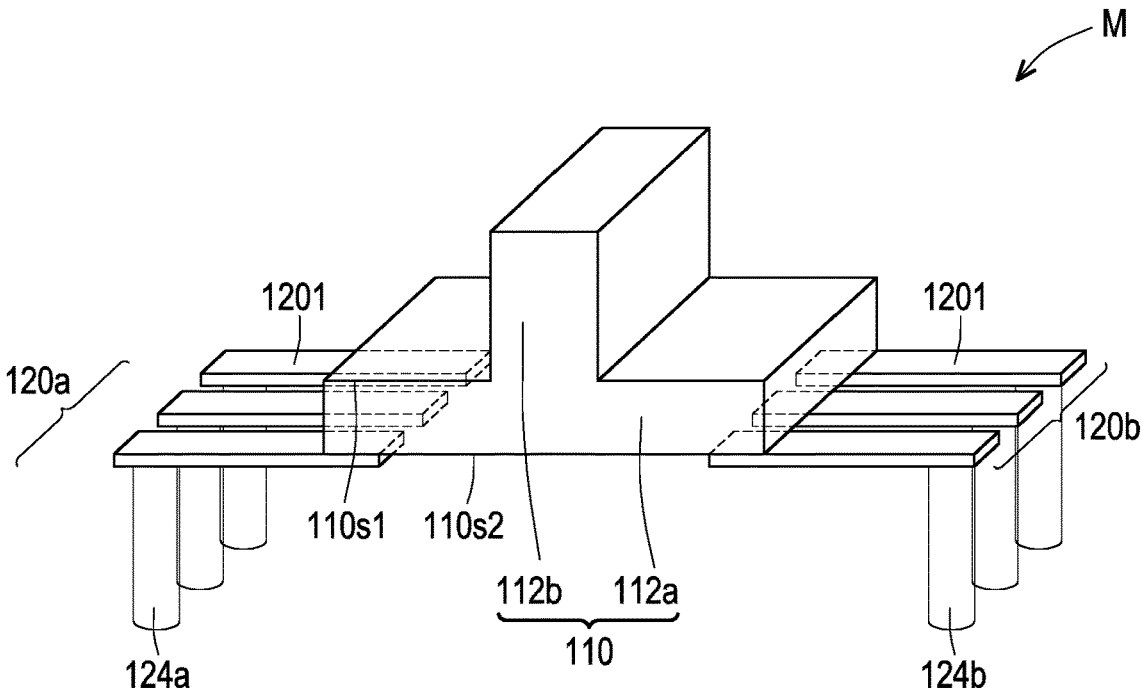
Figure 8C:
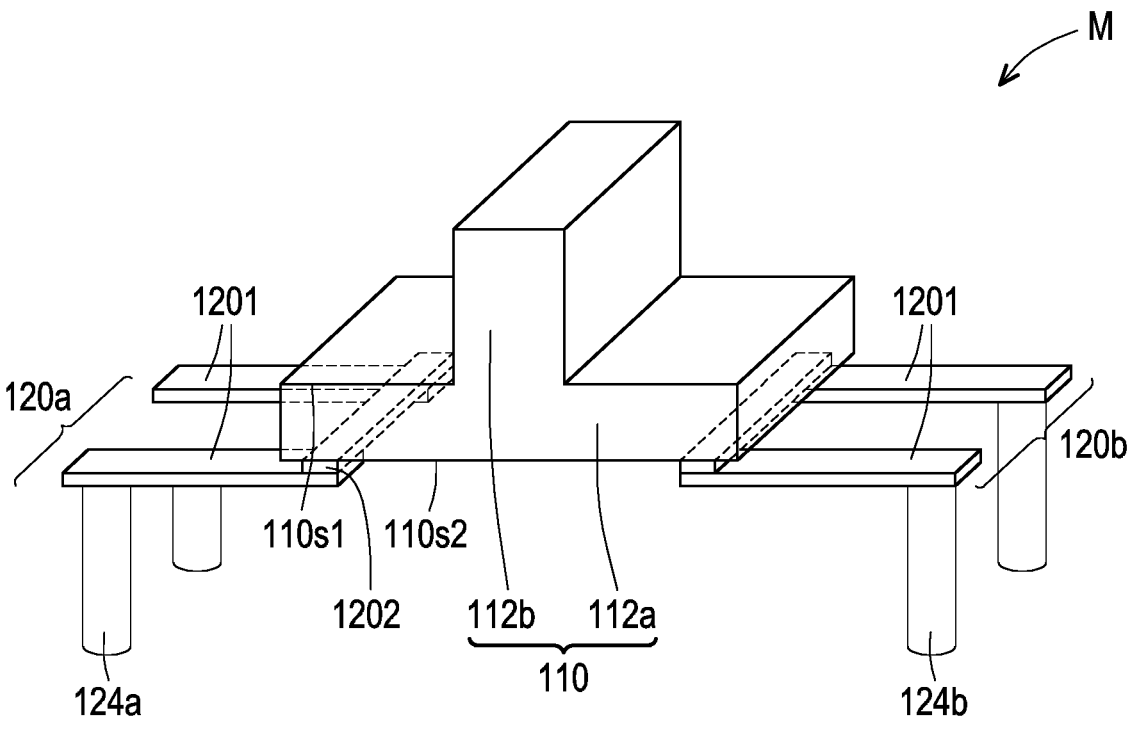

In the above embodiments, the electrodes 120*a*, 120*b* are disposed on the waveguide 110, and the waveguide 110 is disposed between the electrode 120*a*, 120*b* and the insulating layer 104 (or substrate 102 if present). However, the disclosure is not limited thereto. In some embodiments, as shown in FIG. 7, the electrodes 120*a*, 120*b* are disposed below the waveguide 110, and thus the electrode 120*a*, 120*b* are disposed between the waveguide 110 and the insulating layer 104 (or substrate 102 if present). In such embodiments, the electrodes 120*a*, 120*b* may be formed before the waveguide 110. For example, the electrodes 120*a*, 120*b* in a dielectric layer 117 are formed on the insulating layer 104 to electrically connect the vias 124*a*, 124*b*, and then the waveguide 110 is formed on the electrodes 120*a*, 120*b* and the dielectric layer 117 and between the electrodes 120*a*,

120*b*. After that, the dielectric layer 122 is formed to cover the electrodes 120*a*, 120*b* and the waveguide 110, for example. In some embodiments, the electrodes 120*a*, 120*b* respectively include a liner layer 118 and a conductive layer 119. The formation and material of the liner layer 118 and the conductive layer 119 may be similar to the liner layer 126 and the conductive layer 128 of the first and second vias 124*a*. 124*b* and thus details are omitted. In alternative embodiments, the electrodes 120*a*, 120*b* may be formed simultaneously with the vias 124*a*, 124*b* therebelow by a dual damascene process. In some embodiments, the ridge portion 112*b* of the waveguide 110 is disposed at the first surface 110*s*1 of the waveguide, and the electrodes 120*a*, 120*b* are disposed at the second surface 110*s*2 opposite to the first surface 110*s*1. As shown in FIGS. 8A to 8C, the electrodes 120*a*, 120*b* may be in a form of plate (FIG. 8A), sheet (FIG. 8B), bar (FIG. 8C), the like or combinations thereof. The modulators M of FIGS. 8A to 8C are similar to those of FIGS. 6A to 6C, and difference lies in that the electrodes 120*a*, 120*b* of FIGS. 8A to 8C are disposed below the waveguide 110. For example, the electrodes 120*a*, 120*b* of FIGS. 8A to 8C are in direct contact with the second surface 110*s*2 (e.g., bottom surface) of the waveguide 110 while the electrodes 120*a*, 120*b* of FIGS. 6A to 6C are in direct contact with the first surface 110*s*1 (e.g., top surface) of the waveguide 110.

The modulator M may be further integrated with other electrical and/or photonic devices to form a photonic die (e.g., photonic die 30), a photonic package (e.g., photonic package 14), a semiconductor package (e.g., semiconductor package 1) or the like and details will be described with reference to FIG. 9.

Figure 9:
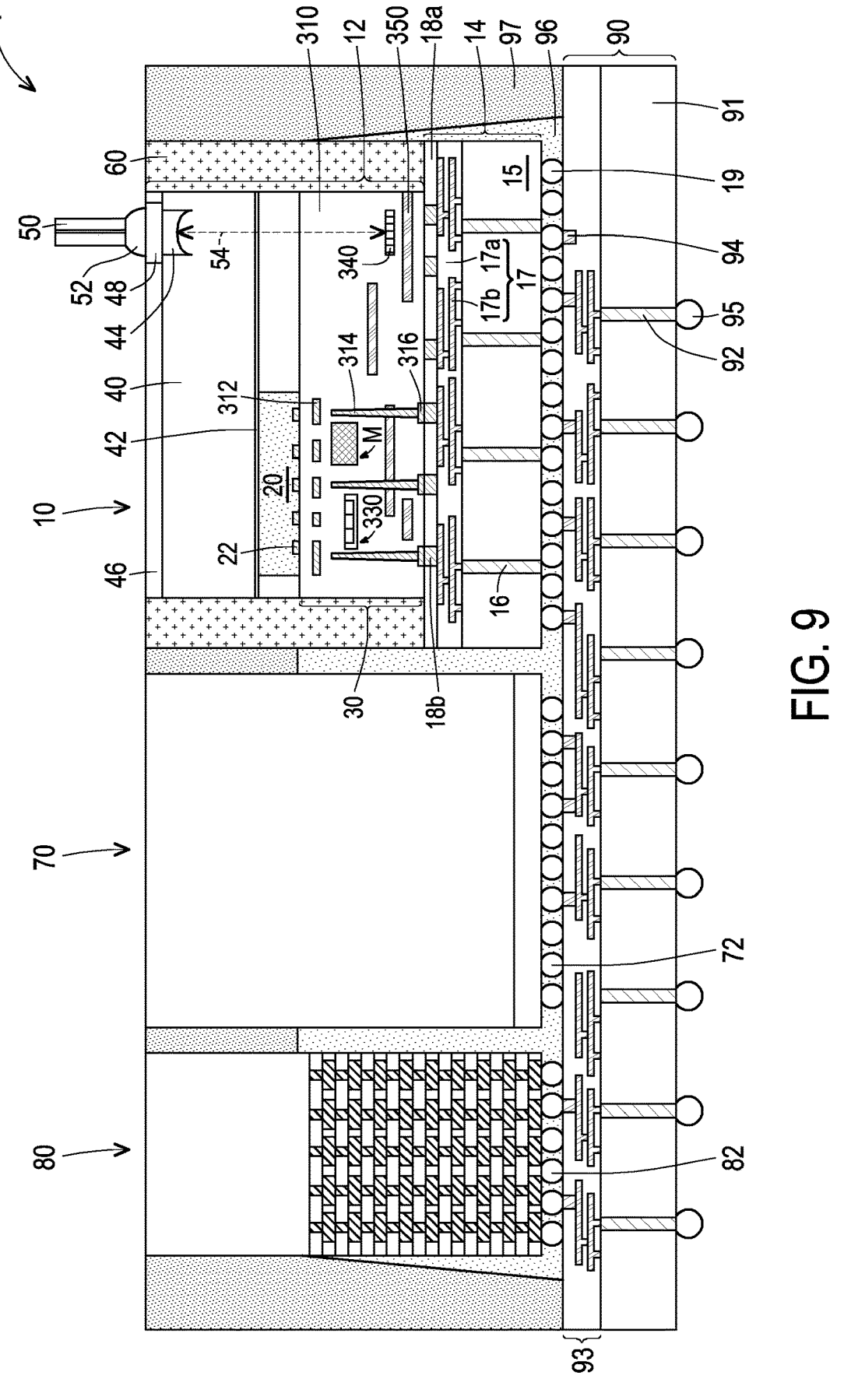
FIG. 9 is a schematic cross-sectional view of a semiconductor package including the modulator according to some embodiments.

FIG. 9 is a schematic cross-sectional view of a semiconductor package including the modulator M according to some embodiments. FIG. 10A to FIG. 10D are simplified cross-sectional views of the connection between the modulator and the electronic die according to some embodiments.

In some embodiments, a semiconductor package 1 includes a semiconductor device 10, a semiconductor device 70 (e.g., a processor) and a semiconductor device 80 (e.g., a memory device) bonded to an interposer 90. The semiconductor device 10 may include a photonic package (also referred to as an optical engine) 12 and an interposer 14. In some embodiments, the photonic package 12 provides an input/output (I/O) interface between optical signals and electrical signals. In some embodiments, the photonic package 12 provides an optical network for signal communication between components (e.g., photonic devices, integrated circuits, couplings to external fibers, etc.) within the photonic package 12.

In some embodiments, the photonic package 12 includes an electronic die 20 and a photonic die 30. In the illustrated embodiments, the electronic die 20 does not receive, transmit, or process optical signals, and the photonic die 30 may receive, transmit, or process optical signals, such as converting an optical signal into an electric signal, or vice versa. Besides optical signals, the photonic die 30 may also transmit, receive, or process electrical signals. The electronic die 20 may include die conductive connectors 22, which may be, for example, conductive pads, conductive pillars, or the like. The electronic die 20 may include integrated circuits for interfacing with the modulator M and/or other photonic components, such as circuits for controlling the operation of the modulator M. For example, the electronic die 20 may include controllers, drivers, transimpedance amplifiers, the like, or combinations thereof. The electronic die 20 may also include a CPU, in some embodiments. In some embodiments, the electronic die 20 includes circuits for processing electrical signals received from photonic components, such as for processing electrical signals received from a photodetector (e.g., photodetector 330). The electronic die 20 may control high-frequency signaling of the modulator M and/or other photonic components according to electrical signals (digital or analog) received from another device or die, in some embodiments. In some embodiments, the electronic die 20 may be an electronic integrated circuit (EIC) or the like that provides Serializer/Deserializer (SerDes) functionality. In this manner, the electronic die 20 may act as part of an I/O interface between optical signals and electrical signals within a photonic package. In some embodiments, the photonic package 12 described herein could be considered system-on-chip (SoC) or system-on-integrated-circuit (SoIC) devices.

In some embodiments, the photonic die 30 includes a dielectric layer 310 and a plurality of conductive features 312, vias 314, conductive pads 316, a photodetector 330, a modulator M, a grating coupler 340 and waveguides 350 in the dielectric layer 310. The dielectric layer 310 may be similar to the dielectric layer 122. For example, the dielectric layer 310 includes silicon oxide. The conductive features 312 may be conductive lines and vias and are electrically connected to each other, to provide interconnections and electrical routing. The conductive features 312 may be further electrically connected to the vias 314 and the conductive pads 316. In some embodiments, the conductive pads 316 are further electrically connected to the conductive pads 18b of the interposer 14, so as to bond the photonic package 12 onto the interposer 14. The waveguides 350 may be silicon waveguides, nitride waveguides, the like or combinations thereof. In some embodiments, one or more of the waveguides 350 form a continuous loop. Since optical coupling may happen between waveguides 350 placed in close proximity, optical signals are allowed to be transmitted (e.g., relayed) in the vertical direction through the optical coupling between adjacent waveguides 350. Other configurations or arrangements of the waveguides 350, the modulator M, or the grating coupler 340 are possible, and other types of photonic components or photonic structures may be formed. In some cases, the waveguides 350, the modulator M, and the grating coupler 340 may be collectively referred to as "the photonic layer."

The photodetector 330 may be optically coupled to the waveguides 350 to detect optical signals within the waveguides 350 and generate electrical signals corresponding to the optical signals. The modulator M may be any one of the modulators M of FIGS. 1I, 2A-2C, 3, 4A-4C, 5E, 6A-6C, 7 and 8A-8C or the like. The modulator M may be optically coupled to the waveguides 350 to receive electrical signals and generate corresponding optical signals within the waveguides 350 by modulating optical power within the waveguides 350. In this manner, the photonic components such as the photodetector 330 and the modulator M facilitate the input/output (I/O) of optical signals to and from the waveguides 350.

Figure 10A:
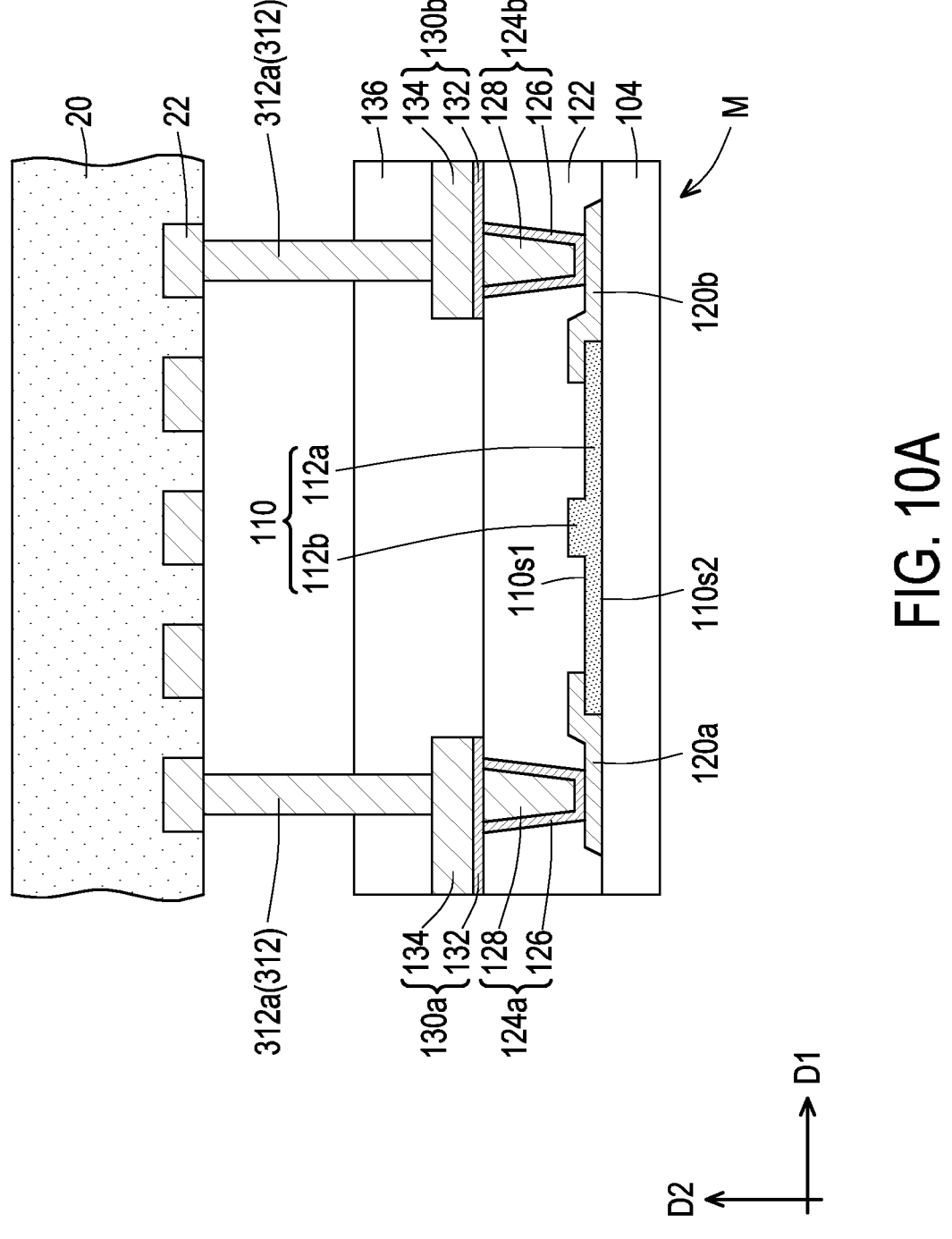
FIG. 10A to FIG. 10D are simplified cross-sectional views of the connection between the modulator and the electronic die according to some embodiments.
Figure 10B:
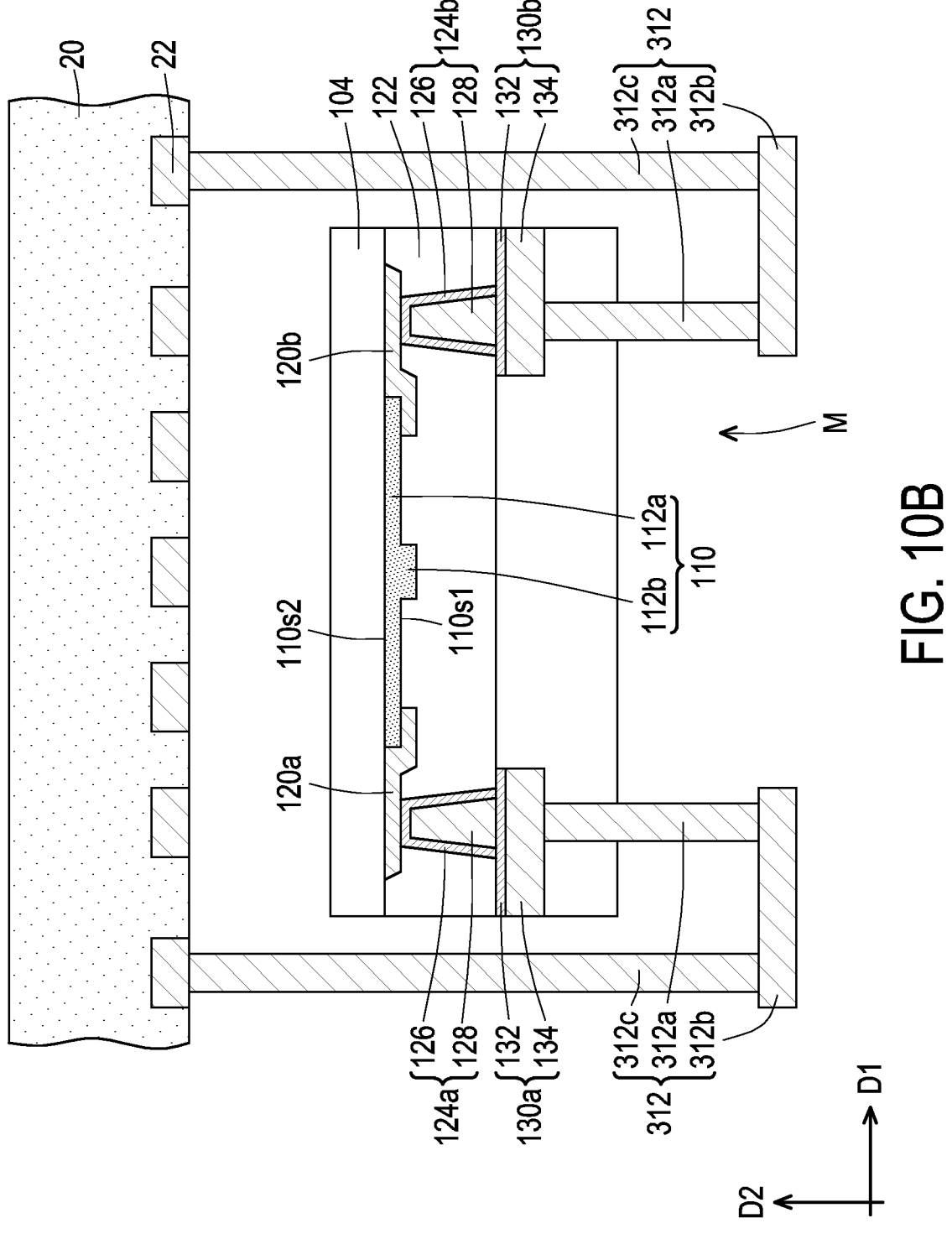
Figure 10C:
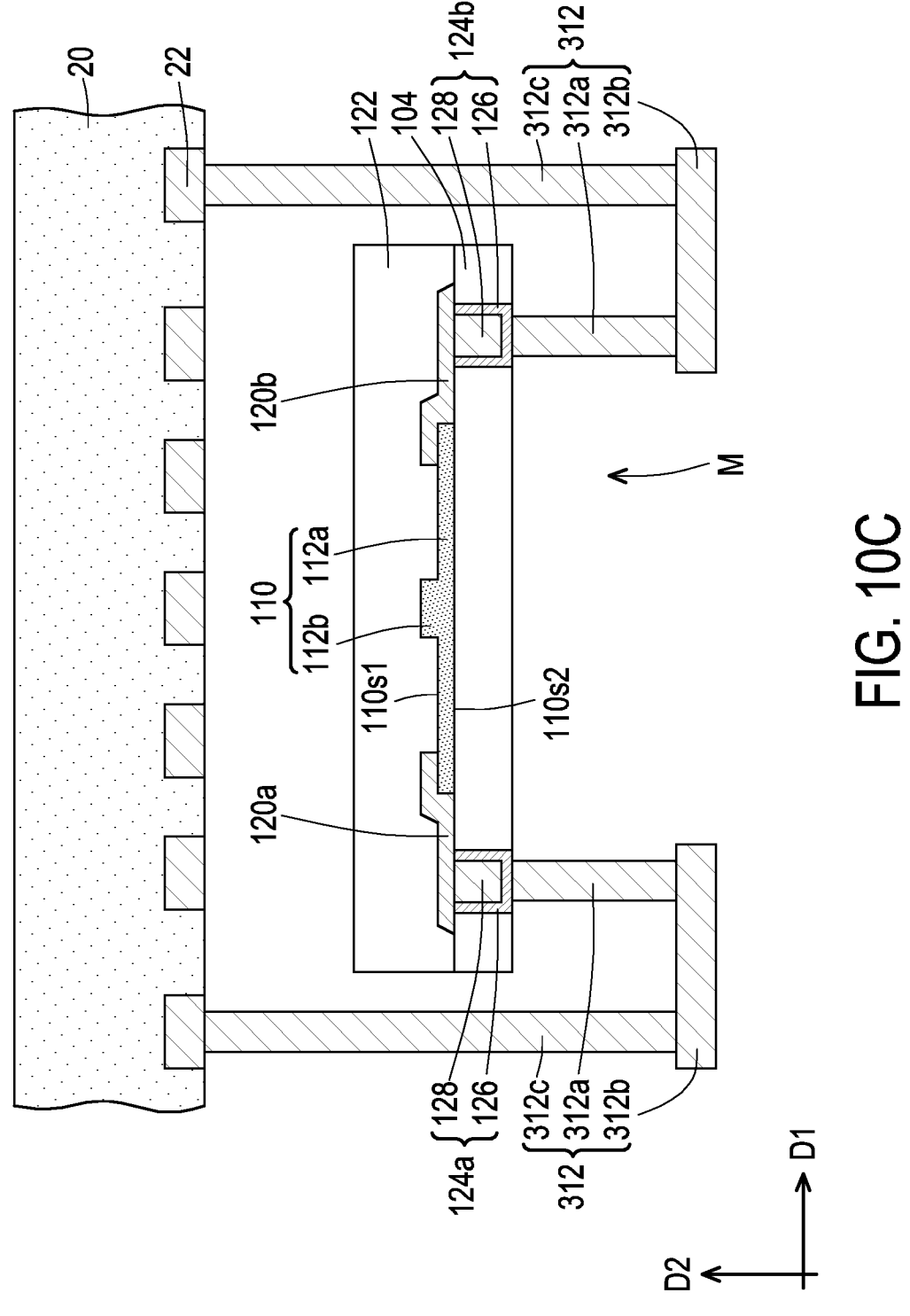
Figure 10D:
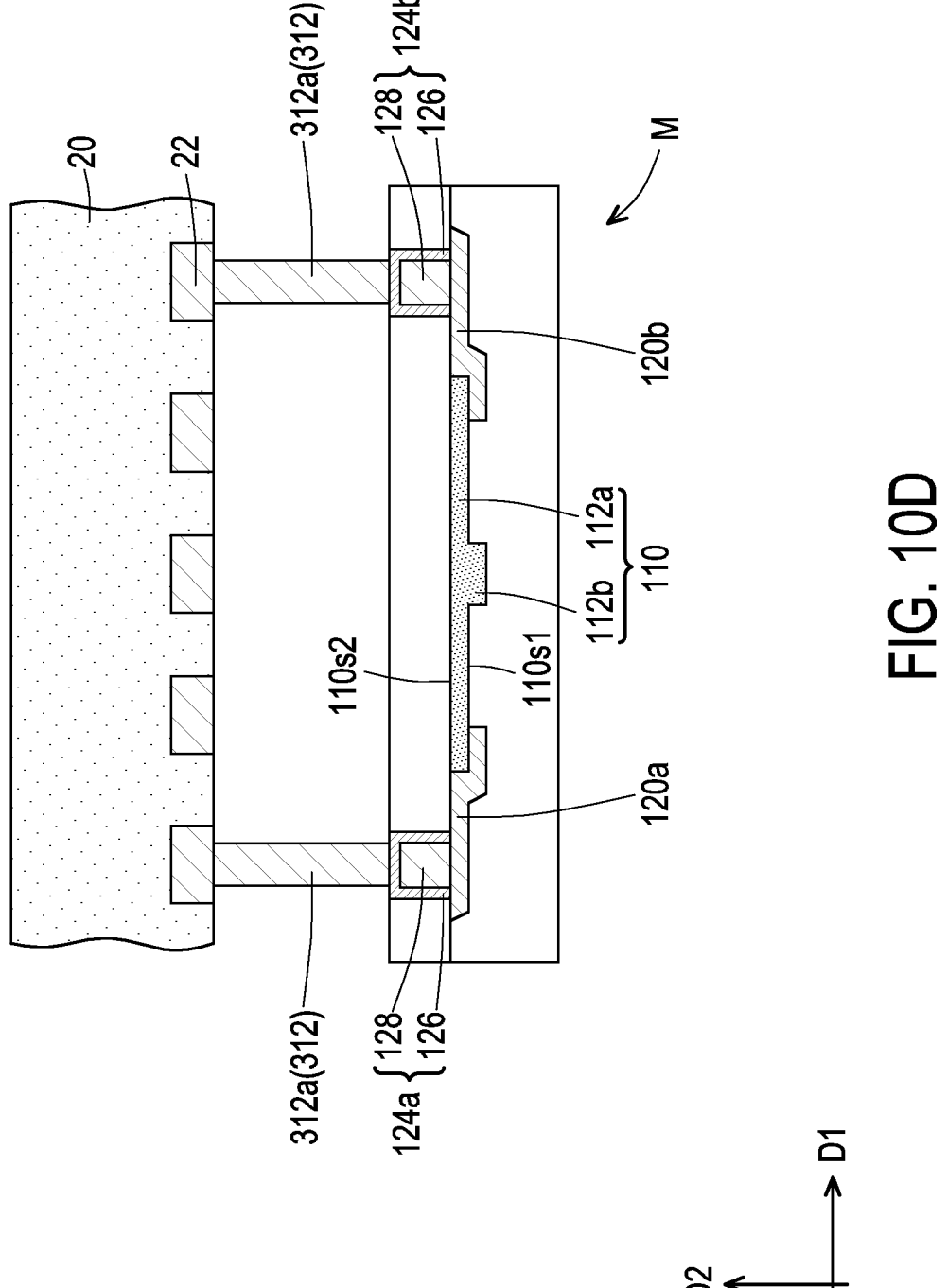

The modulator M (e.g., modulator M of FIGS. 1I, 2A-2C, 3 and 4A-4C) may be electrically connected to the electronic die 20 through the conductive connectors 130a, 130b. In some embodiments, as shown in FIG. 10A, the conductive connectors 130a, 130b of the modulator M are electrically connected to the die conductive connectors 22 of the electronic die 20 through the conductive features 312 (e.g., vias 312a). The vias 312a may be directly connected to the conductive connectors 130a, 130b and the die conductive connectors 22. In some embodiments, as shown in FIG. 10B, the modulator M is disposed upside-down and is electrically connected to the electronic die 20 through the conductive connectors 130a, 130b and the conductive features 312. For example, the conductive features 312 include vias 312a directly connected to the conductive connectors 130a, 130b, conductive lines 312b directly connected to the vias 312a, and vias 312c directly connected to the conductive lines 312b and the die conductive connectors 22 of the electronic die 20. In such embodiments (not shown), the conductive lines 312b may be disposed in and/or on the interposer 14. In some embodiments, the modulator M (e.g., modulator M of FIGS. 5E, 6A-6C, 7 and 8A-8C) may be electrically connected to the electronic die 20 through the vias 124a, 124b. As shown in FIG. 10C, the vias 124a, 124b of the modulator M may be electrically connected to the die conductive connectors 22 of the electronic die 20 through the conductive features 312. For example, the conductive features 312 include conductive lines 312b directly connected to the vias 124a, 124b and vias 312c directly connected to the conductive lines 312b and the die conductive connectors 22 of the electronic die 20. In such embodiments (not shown), the conductive lines 312b may be disposed in and/or on the interposer 14. In some embodiments, as shown in FIG. 10D, the modulator M is disposed upside-down and is electrically connected to the electronic die 20 through the vias 124a, 124b and the conductive features 312 (e.g., vias 312a). The vias 312a may be directly connected to the vias 124a, 124b and the die conductive connectors 22.

The grating coupler 340 is a photonic structure that allows optical signals and/or optical power to be transferred between the waveguides 350 and a photonic component such as the optical fiber 50 or a waveguide of another photonic system. In alternative embodiments, the photonic components may include other active or passive components, such as laser diodes, optical signal splitters, or other types of photonic structures or devices. Optical power may be provided to the waveguides 350 by, for example, an optical fiber 50 coupled to an external light source, or the optical power may be generated by a laser diode.

In some embodiments, the photonic package 12 may optionally include a support 40, a micro lens 44, a dielectric layer 46 and an index matching material 48. The support 40 is a rigid structure that is attached to the structure in order to provide structural or mechanical stability. The support 40 may include one or more materials such as silicon (e.g., a silicon wafer, bulk silicon, or the like), a silicon oxide, a metal, an organic core material, the like, or another type of material. The support 40 may be attached to the structure (e.g., to the dielectric layer 320 and/or the electronic die 20) using an adhesive layer 42. The micro lens 44 may be embedded in the support 40 at the upper surface of the support 40. The dielectric layer 46 is disposed over the support 40, and the index matching material 48 is disposed in the dielectric layer 46 over (e.g., directly over) the micro lens 44. The dielectric layer 46 may be formed of a suitable material, such as silicon oxide, silicon nitride, a polymer material, or the like. An etching process is then performed to remove a portion of the dielectric layer 46 to form a recess over the micro lens 44. The index matching material 48 may be disposed in the recess in the dielectric layer 46. In some embodiments, the index matching material 48 is used to reduce light loss for light coming from or going into the optical fiber 50, and has a refractive index of, e.g., about 1.4 to match the refractive index of silicon oxide. In alternative embodiments, the dielectric layer 46 and the index matching material 48 are omitted.

In some embodiments, the photonic package 12 is bonded to the interposer 14. The interposer 14 includes a substrate 15 with through substrate vias (TSVs) 16, a RDL structure 17 on the substrate 15, conductive pads 18b in a dielectric layer 18a over the RDL structure 17 and conductive connectors 19. The substrate 15 may be, e.g., a silicon substrate, doped or undoped, or an active layer of a silicon-on-insulator (SOI) substrate. However, the substrate 15 may alternatively be a glass substrate, a ceramic substrate, a polymer substrate, or any other substrate that may provide a suitable protection and/or interconnection functionality. These and any other suitable materials may alternatively be used for the substrate 15. The RDL structure 17 includes one or more dielectric layers 17a (e.g., silicon oxide layers), and conductive features 17b such as conductive lines and vias. The conductive pads 18b are formed to extend through the dielectric layer 18a to connect with the conductive features 17b of the RDL structure 17. In some embodiments, the photonic package 12 is bonded to the interposer 14 through bonding the conductive pads 318 and the conductive pads 18. The conductive connectors 19 are formed on the lower surface of the interposer 14 to connect with the TSVs 16. The conductive connectors 19 may be, e.g., ball grid array (BGA) conductive connectors, solder balls, metal pillars, controlled collapse chip connection (C4) bumps, micro bumps, electroless nickel-electroless palladium-immersion gold technique (ENEPIG) formed bumps, or the like. In alternative embodiments, the interposer 14 may further include waveguides. In some embodiments, a molding material 60 is formed over the interposer 14 around the photonic structure.

In some embodiments, the photonic package 12 is shown as coupled to the vertically-mounted optical fiber 50. In alternative embodiments, the photonic package 12 may be further coupled to or only coupled to an edge-mounted optical fiber. The optical fiber 50 may be mounted to the photonic package 12 using an optical glue 52 or the like.

In some embodiments, the optical fiber 50 may be configured to optically couple to a grating coupler within the photonic package 12, such as the grating coupler 340. The optical fiber 50 may be mounted at an angle with respect to the vertical axis or may be laterally offset from the grating coupler 340. The optical signals and/or optical power transmitted between the optical fiber 50 and the grating coupler 340 are transmitted through the dielectric layer 310, the adhesive layer 42, and the support 40 formed over the grating coupler 340, as illustrated by a light path 54. Optical signals may be transmitted from the optical fiber 50 to the grating coupler 340 and into the waveguides 350, wherein the optical signals may be detected by the photodetector 330 and transmitted as electrical signals into the electronic die 20. Optical signals generated within the waveguides 350 by the modulator M may similarly be transmitted from the grating coupler 340 to the optical fiber 50.

In some embodiments, the semiconductor device 70 includes, e.g., a processing die, a central processing unit (CPU), a graphics processing unit (GPU), an application-specific integrated circuit (ASIC), a high performance computing (HPC) die, the like, or combinations thereof. In some embodiments, the semiconductor device 80 includes, e.g., a memory die, a high-bandwidth memory (HBM) device, a volatile memory such as dynamic random-access memory (DRAM), static random-access memory (SRAM), another type of memory, or the like.

The interposer 90 is similar to the interposer 14. For example, the interposer 90 includes a substrate 91 with through substrate vias (TSVs) 92, a RDL structure 93 on the substrate 91, conductive pads 94 over the RDL structure 93 and conductive connectors 95. Conductive connectors 72 of the semiconductor device 70 are bonded to the conductive pads 94 of the interposer 90, and conductive connectors 82 of the semiconductor device 80 are bonded to conductive pads 94 of the interposer 90, for example. An underfill material 96 is formed between the interposer 14 and the interposer 90, and between the semiconductor devices 70/80 and the interposer 90. A molding material 97 is formed over the interposer 90 around the semiconductor devices 10/70/80.

In some embodiments, by integrating the modulator into a photonic die, a photonic package, a semiconductor package or the like, the extinction of the electric field and the light intensity loss may be reduced. Thus, the photonic die, the photonic package, the semiconductor package or the like may have an improved performance.

According to some embodiments, an electro-optical device includes a waveguide and a first electrode and a second electrode. The first electrode and the second electrode at first and second sides of the waveguide, wherein the first electrode and the second electrode directly contact and extend beyond the first and second sides of the waveguide respectively.

According to some embodiments, an electro-optical device includes a waveguide, a first electrode and a first via. The first electrode physically contacts the waveguide. The first via physically contacts the first electrode, wherein a first vertical projection of the first via onto the first electrode is separated from a second vertical projection of the waveguide onto the first electrode.

According to some embodiments, an electro-optical device includes a waveguide, a first electrode and a second electrode and a first conductive pillar and a second conductive pillar. The first electrode and the second electrode physically connect the waveguide, and the first electrode and the second electrode are disposed on opposite sides of the waveguide along a first direction. The first conductive pillar and the second conductive pillar physically connect the first electrode and the second electrode respectively, wherein a smallest distance between the first conductive pillar and the second conductive pillar is larger than a total width of the waveguide along the first direction.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electro-optical device, comprising:
a waveguide; and
a first electrode and a second electrode at first and second lateral sides of the waveguide, wherein the first electrode and the second electrode contact and extend beyond the first and second lateral sides of the waveguide respectively; and
a first via contacting a top surface of the first electrode, wherein the first electrode contacts a top surface and a lateral side of the waveguide to cover the waveguide.

2. The electro-optical device of claim 1, wherein the first electrode is in a form of plate, sheet or bar.

3. The electro-optical device of claim 1, wherein the first electrode comprises a plurality of sub-electrodes separated from each other.

4. The electro-optical device of claim 1, wherein the first electrode comprises a plurality of sub-electrodes and a connecting electrode physically connected to the sub-electrodes.

5. The electro-optical device of claim 4, wherein the connecting electrode is entirely in direct contact with the waveguide.

6. The electro-optical device of claim 1, wherein the waveguide comprises a ridge portion between the first electrode and the second electrode.

7. The electro-optical device of claim 1, wherein the waveguide comprises a ridge portion at a first surface of the waveguide, and the first electrode is disposed on the first surface of the waveguide.

8. The electro-optical device of claim 1, wherein the waveguide comprises a ridge portion at a first surface of the waveguide, and the first electrode is disposed on a second surface opposite to the first surface of the waveguide.

9. The electro-optical device of claim 1, wherein a portion of the first electrode is not overlapped with the waveguide along a stacking direction of the waveguide and the first electrode, and a portion of the second electrode is not overlapped with the waveguide along the stacking direction.

10. An electro-optical device, comprising:

a waveguide;

a first electrode physically contacting the waveguide; and a first via physically contacting the first electrode, wherein a first vertical projection of the first via onto the first electrode is separated from a second vertical projection of the waveguide onto the first electrode, and the first electrode contacts a top surface and a lateral side of the waveguide to cover the waveguide.

11. The electro-optical device of claim 10, wherein the first via comprises a plurality of vias respectively connected to the first electrode.

12. The electro-optical device of claim 10, wherein the first electrode comprises a plurality of sub-electrodes, and the first via comprises a plurality of vias respectively connected to the sub-electrodes.

13. The electro-optical device of claim 10, wherein a portion of the first electrode is not overlapped with the waveguide along a stacking direction of the waveguide and the first electrode.

14. The electro-optical device of claim 10, further comprising a first conductive connector electrically connected to the first via, wherein a third vertical projection of the first conductive connector on the first electrode is separated from the second vertical projection of the waveguide on the first electrode.

15. An electro-optical device, comprising:

a waveguide;

a first electrode and a second electrode physically connected to the waveguide, the first electrode and the second electrode disposed on opposite sides of the waveguide along a first direction; and a first conductive pillar and a second conductive pillar physically connected to the first electrode and the second electrode respectively, wherein a smallest distance between the first conductive pillar and the second conductive pillar is larger than a total width of the waveguide along the first direction, the waveguide comprises a ridge portion at a first surface of the waveguide, and the first and second electrodes are disposed on the first surface of the waveguide or are disposed on a second surface opposite to the first surface of the waveguide.

16. The electro-optical device of claim 15, wherein a largest distance between the first electrode and the second electrode is larger than the total width of the waveguide along the first direction.

17. The electro-optical device of claim 15, wherein the first conductive pillar and the second conductive pillar are disposed on the opposite sides of the waveguide along the first direction.

18. The electro-optical device of claim 15, further comprising a first conductive connector electrically connected to the first via and a second conductive connector electrically connected to the second via, wherein a smallest distance between the first conductive connector and the second conductive connector is larger than a total width of the waveguide along the first direction.

19. The electro-optical device of claim 10, further comprising a dielectric layer, wherein the waveguide and the first electrode are disposed on and in physical contact with a top surface of the dielectric layer.

20. The electro-optical device of claim 19, wherein a bottom surface of the waveguide, a bottom surface of the first electrode and the top surface of the dielectric layer are substantially coplanar.

* * * * *